United States Patent
Koos et al.

(10) Patent No.: US 12,298,944 B2
(45) Date of Patent: May 13, 2025

(54) SYSTEM AND METHOD FOR ELIMINATING FULL RESCAN SYNCHRONIZATIONS ON SERVICE RESTARTS

(71) Applicant: Egnyte, Inc., Mountain View, CA (US)

(72) Inventors: Remus Koos, San Jose, CA (US); Tal Broner, Sunnyvale, CA (US); Harikesavan Krishnan, San Jose, CA (US)

(73) Assignee: Egnyte, Inc., Mountain View, CA (US)

( * ) Notice: Subject to any disclaimer, the term of this patent is extended or adjusted under 35 U.S.C. 154(b) by 179 days.

(21) Appl. No.: 17/733,418

(22) Filed: Apr. 29, 2022

(65) Prior Publication Data

US 2022/0335011 A1 Oct. 20, 2022

Related U.S. Application Data

(63) Continuation of application No. 15/839,451, filed on Dec. 12, 2017, now Pat. No. 11,341,100.

(60) Provisional application No. 62/432,852, filed on Dec. 12, 2016.

(51) Int. Cl.
| | |
|---|---|
| G06F 16/178 | (2019.01) |
| G06F 16/11 | (2019.01) |
| G06F 16/17 | (2019.01) |
| G06F 16/176 | (2019.01) |
| G06F 16/23 | (2019.01) |
| G06F 16/27 | (2019.01) |

(52) U.S. Cl.
CPC ......... *G06F 16/178* (2019.01); *G06F 16/122* (2019.01); *G06F 16/128* (2019.01); *G06F 16/1734* (2019.01); *G06F 16/176* (2019.01); *G06F 16/23* (2019.01); *G06F 16/27* (2019.01)

(58) Field of Classification Search
CPC ........................ G06F 16/178; G06F 16/1734
See application file for complete search history.

(56) References Cited

U.S. PATENT DOCUMENTS

| | | | | |
|---|---|---|---|---|
| 6,810,405 | B1 * | 10/2004 | LaRue | A61M 19/00 707/621 |
| 8,442,943 | B2 * | 5/2013 | Multer | H04L 67/1095 713/400 |
| 2004/0205263 | A1 * | 10/2004 | Sivaraman | H04L 9/12 710/21 |
| 2005/0235019 | A1 * | 10/2005 | Yang | H04L 9/40 |

(Continued)

*Primary Examiner* — Marc S Somers

(74) *Attorney, Agent, or Firm* — Larry E. Henneman, Jr.; Henneman & Associates, PLC

(57) ABSTRACT

A novel method for restarting a steady-state synchronization process includes persisting synchronization data in non-volatile memory before restarting, and utilizing the persisted synchronization data to restart the synchronization where the prior steady-state synchronization process left off. In a particular embodiment, the synchronization data is indicative of a particular point of the synchronization process and is utilized to begin synchronizing from that point after the service is restarted. In a more particular embodiment, the synchronization data is a particular operation of a sequence of operations performed as part of the synchronization. In another particular embodiment, operations associated with a batch are applied before stopping the synchronization.

25 Claims, 15 Drawing Sheets

(56) References Cited

U.S. PATENT DOCUMENTS

2015/0142860 A1* 5/2015 George ............ G06F 3/0611
 707/812
2016/0085769 A1* 3/2016 Penangwala ........ G06F 16/178
 707/610

* cited by examiner

SYSTEM AND METHOD FOR ELIMINATING FULL RESCAN SYNCHRONIZATIONS ON SERVICE RESTARTS

CROSS-REFERENCE TO RELATED APPLICATIONS

This application is a continuation of co-pending U.S. patent application Ser. No. 15/839,451, filed Dec. 12, 2017 by at least one common inventor, which claims the benefit of U.S. Provisional Patent Application Ser. No. 62/432,852, filed on Dec. 12, 2016 by at least one common inventor, every one of which is incorporated by reference herein in its entirety.

BACKGROUND OF THE INVENTION

Field of the Invention

This invention relates generally to computer systems, and more particularly to cloud storage systems. Even more particularly, this invention relates to synchronizing a cloud file system and a local file system in a hybrid cloud storage system.

Description of the Background Art

Cloud computing systems are known. In a cloud computing system, computing and storage services are provided to remote clients over a wide area network such as the Internet. In the case of storage, the client's file system can exist both in the client's local storage device (e.g., a hard drive, network attached storage (NAS) device, etc.) and in the cloud. For example, a backup copy of the client's local file system can be stored in the cloud for both data protection and remote access. However, these benefits are negated as the cloud (remote) file system becomes out of date as more and more changes are made to the local file system and/or the cloud file system.

The client's local and cloud file systems can be resynchronized. Rescan synchronization can be used to resynchronize the remote and local file systems. In a rescan synchronization, the local and cloud file systems are compared on an object-by-object basis to identify differences between them, and then operations are applied to the local and cloud file systems to bring them back into synchronization. Unfortunately, rescan synchronizations are very memory and processor intensive, especially for file systems with large namespaces. Additionally, rescan synchronizations can take a very long time to complete.

Other synchronization processes might be used in addition to rescan synchronizations. However, whenever synchronization services are restarted, follow-up full rescan synchronization are still performed on the local and cloud file systems. Thus, even in systems with additional synchronization processes, rescan synchronizations are still utilized and cause associated performance degradation.

SUMMARY

The present invention overcomes the problems associated with the prior art by providing a method for restarting steady-state synchronization services without invoking a follow-on rescan synchronization. The invention facilitates resuming steady-state synchronization after service restarts by saving an indicator of the progress of the prior steady-state synchronization and utilizing the indicator to restart the steady-state synchronization from the point it was interrupted. The invention allows cloud customers to pause steady-state synchronization services (e.g. for upgrading software) without invoking a time-consuming rescan synchronization.

An example method of the present invention, to be performed in a local file storage system, for synchronizing a local file system (LFS) stored on the local file storage system with a remote file system (RFS) stored on a remote file storage system (e.g., a cloud storage system) includes generating a sequence of file system operations based on differences between the LFS and the RFS, synchronizing the LFS and the RFS based on the sequence of the file system operations, receiving a termination signal indicating that synchronizing the LFS and the RFS is to be stopped, persisting restart information in non-volatile memory, and stopping the step of synchronizing the LFS and the RFS. The step of synchronizing includes applying some of the file system operations of the sequence to the LFS and providing others of the file system operations of the sequence to the remote file storage system for application to the RFS. The restart information identifies a first portion of the sequence of file system operations, which was applied to the LFS or the RFS, and a second portion of the sequence of file system operations that was not applied to the LFS or the RFS.

A particular example method further includes applying a plurality of operations associated with a batch from the first portion of the sequence of file system operations. The operations associated with the batch are applied after receiving the termination signal and before the step of stopping the synchronizing of the LFS and the RFS.

Another particular example method also includes restarting the step of synchronizing the LFS and the RFS at the beginning of the second portion of the sequence of the file system operations based on the restart information. In a more particular example method, the step of persisting the restart information to non-volatile memory includes persisting at least part of the second portion of the sequence of file system operations to the memory, and the step of restarting the step of synchronizing the LFS and the RFS includes retrieving the at least part of the second portion of the sequence of file system operations from the non-volatile memory.

In still another particular example method, the step of persisting the restart information includes persisting at least one file system operation of the sequence, and in one more particular example method, the step of persisting the restart information includes persisting a plurality of the file system operations of the sequence. Another more particular example method further includes retrieving the at least one persisted operation from the non-volatile memory and restarting synchronization of the LFS and the RFS based on the at least one persisted file system operation. Even more particularly still, the step of restarting synchronization of the LFS and RFS includes regenerating the sequence of file system operations, comparing the at least one persisted file system operation of the sequence to the regenerated sequence of file system operations to match the at least one persisted file system operation with at least one file system operation of the regenerated sequence, and restarting synchronization of the LFS and the RFS based on the at least one matched operation of the regenerated sequence.

Still even more particular example methods are disclosed. In one, the step of persisting at least one operation of the sequence of file system operations includes persisting exactly one operation of the sequence of file system operations and the exactly one persisted operation is a first operation of the second portion of the sequence of file system operations.

Another further includes performing a snapshot-based synchronization of the LFS and the RFS if the step of comparing yields no match.

A third includes receiving a second termination signal following the step of restarting the synchronization and persisting new restart information in the non-volatile memory responsive to the second termination signal. The second termination signal indicates that synchronizing the LFS and the RFS is to again be stopped. New restart information is persisted in the non-volatile memory only if the step of comparing has matched the at least one persisted file system operation with at least one file system operation of the regenerated sequence.

A fourth includes collecting events indicative of changes made to at least one of the LFS and the RFS. Additionally, the step of generating the sequence of file system operations includes generating the sequence of file system operations based on at least some of the events. Also, the step of regenerating the sequence of file system operations includes generating the sequence of file system operations again based on the same ones of the events.

An example local file storage system for synchronizing a local file system (LFS) stored thereon with a remote file system (RFS), stored on a remote file storage system (e.g., a cloud storage system) remotely located from the file storage system, is also disclosed. The file storage system includes a processor configured to execute code, non-volatile memory configured to store data including when the local file storage system is powered down, and a storage synchronizer. The storage synchronizer is configured to generate a sequence of file system operations based on differences between the LFS and the RFS, synchronize portions of the LFS and the RFS, receive a termination signal indicating that synchronization of the LFS and the RFS is to be stopped, persist restart information in non-volatile memory responsive to the termination signal, and stop synchronization of the LFS and the RFS responsive to the termination signal. The sequence of file system operations synchronizes the LFS and the RFS when applied thereto. The storage synchronizer synchronizes the LFS and the RFS by applying some of the sequence of file system operations to the LFS and providing others of the sequence of file system operations to the remote file storage system for application to the RFS. The restart information identifies a first portion of the sequence of file system operations that was applied to the LFS or the RFS and a second portion of the sequence of file system operations that was not applied to the LFS or the RFS.

In a particular example embodiment, the storage synchronizer is configured to apply a plurality of operations associated with a batch from the first portion of the sequence of file system operations after receiving the termination signal and before stopping the synchronization of the LFS and the RFS.

In another particular example embodiment, the storage synchronizer is further operative to restart synchronization of the LFS and the RFS at the beginning of the second portion of the sequence of the file system operations, based on the restart information. In a more particular example embodiment the storage synchronizer is configured to persist the second portion of the sequence of file system operations to the non-volatile memory as the restart information and retrieve the second portion of the sequence of file system operations from the non-volatile memory as part of restarting the synchronization.

In still another particular example embodiment, the storage synchronizer is configured to persist at least one file system operation of the sequence in the non-volatile memory, and in a more particular example embodiment, the storage synchronizer is configured to persist a plurality of the file system operations of the sequence.

In another more particular example embodiment, the storage synchronizer is further configured to retrieve the at least one persisted operation from the non-volatile memory and restart synchronization of the LFS and the RFS based on the at least one persisted file system operation. Even more particular example embodiment, the storage synchronizer is further configured to regenerate the sequence of file system operations, compare the at least one persisted file system operation of the sequence to file system operations of the regenerated sequence to match the at least one persisted file system operation with at least one file system operation of the regenerated sequence, and restart synchronization of the LFS and the RFS based on the at least one matched operation of the regenerated sequence.

Still even more particular example embodiments are also disclosed. In one example, the storage synchronizer is further configured to persist exactly one operation of the sequence of file system operations. The exactly one persisted operation is a first operation of the second portion of the sequence of file system operations.

In another still even more particular example embodiment, the storage synchronizer is further configured to receive a second termination signal following restart of the synchronization of the LFS and the RFS and persist new restart information in the non-volatile memory responsive to the second termination signal only if the at least one persisted file system operation has been matched with at least one file system operation of the regenerated sequence. The second termination signal indicates that synchronization of the LFS and the RFS is to again be stopped.

In a third, the storage synchronizer is further operative to perform a snapshot-based synchronization of the LFS and the RFS if the comparison yields no match.

In yet another even more particular example embodiment, the local file storage system further includes one or more events databases storing a plurality of events, where each of the events is indicative of a change made to at least one of the LFS and the RFS. The storage synchronizer is operative to generate the sequence of file system operations based on at least some of the events, and regenerate the sequence of file system operations again based on the same ones of the events.

A non-transitory, electronically-readable storage medium is also disclosed. The storage medium has code embodied thereon for causing an electronic device to synchronize a local file system (LFS) stored on a local file storage system with a remote file system (RFS) stored on a remote (cloud) file storage system. The code is operative to cause the electronic device to generate a sequence of file system operations based on differences between the LFS and the RFS, synchronize the LFS and the RFS based on the sequence of the file system operations, receive a termination signal indicating that synchronization of the LFS and the RFS is to be stopped, persist restart information in non-volatile memory, and stop the step of synchronizing the LFS and the RFS. The code causes the electronic device to synchronize the LFS and RFS by applying some of the file system operations of the sequence to the LFS and providing others of the file system operations of the sequence to the remote file storage system for application to the RFS. The restart information identifies a first portion of the sequence of file system operations that was applied to the LFS or the RFS and a second portion of the sequence of file system operations that was not applied to the LFS or the RFS.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by minimizing the occurrence of rescan synchronizations after service restarts. In the following description, numerous specific details (e.g., particular data structures, process separations, etc.) are set forth in order to provide a thorough understanding of the invention. Those skilled in the art will recognize, however, that the invention may be practiced apart from these specific details. In other instances, details of well-known cloud computing practices and components have been omitted, so as not to unnecessarily obscure the present invention.

Figure 1:
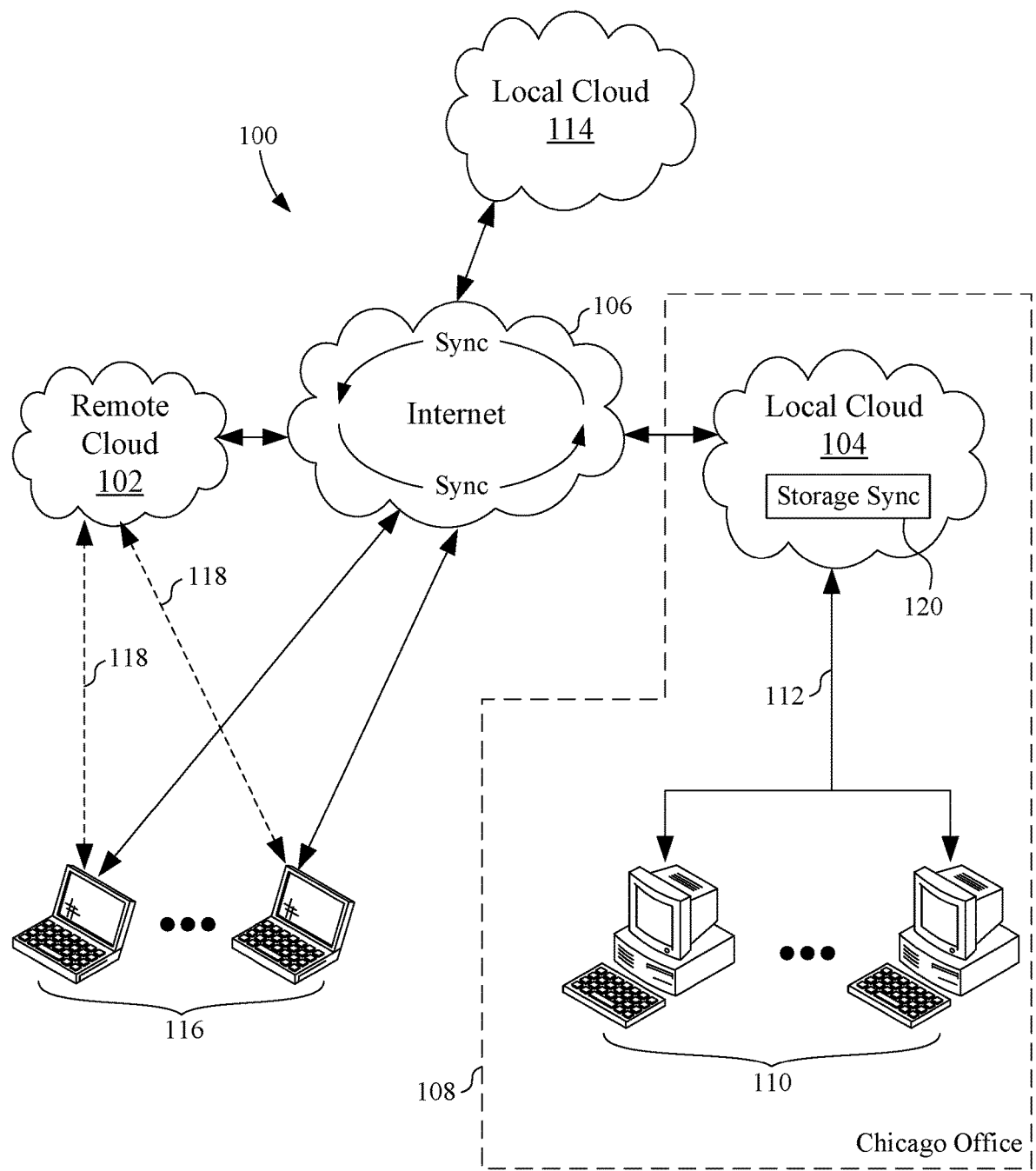
FIG. 1 is a block diagram showing a hybrid cloud computing system.

FIG. 1 shows a hybrid cloud computing system 100 to include a remote file storage system ("remote cloud") 102 and a local file storage system ("local cloud") 104, which communicate and are synchronized via the Internet 106. Local cloud 104 can be hosted, for example, by a file server in an office 108 of a customer and is, therefore, sometimes referred to as an office local cloud (OLC). Local clients 110 enable local users to access local file system objects (e.g., files and folders) by directly accessing those local file system objects stored on local cloud 104 via a local network 112. Local cloud 104 can also extend local user access to file system objects stored on remote cloud 102, and optionally objects on another local cloud 114 (e.g., one associated with the same customer/subscriber), via the Internet 106. Remote clients 116 can access remote file system objects stored on remote cloud 102 via Internet 106 or via some other connection 118 with remote cloud 102. In this embodiment, at least a portion of the local file system (LFS) stored on local cloud 104 is bi-directionally synchronized with a remote file system (RFS) stored on remote cloud 102 to provide local and remote data access and remote data security. Although one-way synchronization of the local and remote file systems is also possible.

Where a customer has multiple offices, as indicated by local cloud 114, the local file systems of both local cloud 104 and local cloud 114 can be synchronized with remote cloud 102. It should be understood that remote cloud 102 can store and synchronize file systems associated with other customers as well, for example, on a subscription basis. However, the terms "customer", "subscription", and "subscriber" are not intended to limit the scope of the invention (e.g., by requiring a fee-for-service arrangement, etc.). For simplicity, the synchronization processes of the present invention will hereinafter be described with reference to local cloud 104 and remote cloud 102, but could equally apply between local cloud 114 and remote cloud 102.

FIG. 1 further shows that local cloud 104 includes a storage synchronizer 120, which carries out synchronization of the LFS on local cloud 104 and the RFS on remote cloud 102. Storage synchronizer 120 controls and coordinates various synchronization processes and provides the customer with some control over those synchronization processes. In one embodiment, storage synchronizer 120 allows a local user with sufficient credentials (e.g., an administrator) to control synchronization and alter associated settings. For example, storage synchronizer 120 enables an administrator to set a synchronization schedule, stop and start synchronization of the LFS and RFS, select which portions of the LFS and RFS should be synchronized, etc. While storage synchronizer 120 might be referred to as an "appliance", it should be understood that storage synchronizer 120 can be implemented in hardware, in software (e.g., as a virtual machine, etc.), or some combination thereof.

As will be described below, storage synchronizer 120 performs both snapshot-based (rescan) synchronizations and steady state synchronizations. However, storage synchronizer 120 minimizes the occurrence of rescan synchronizations after synchronization service restarts and the associated drawbacks thereof.

Figure 2A:
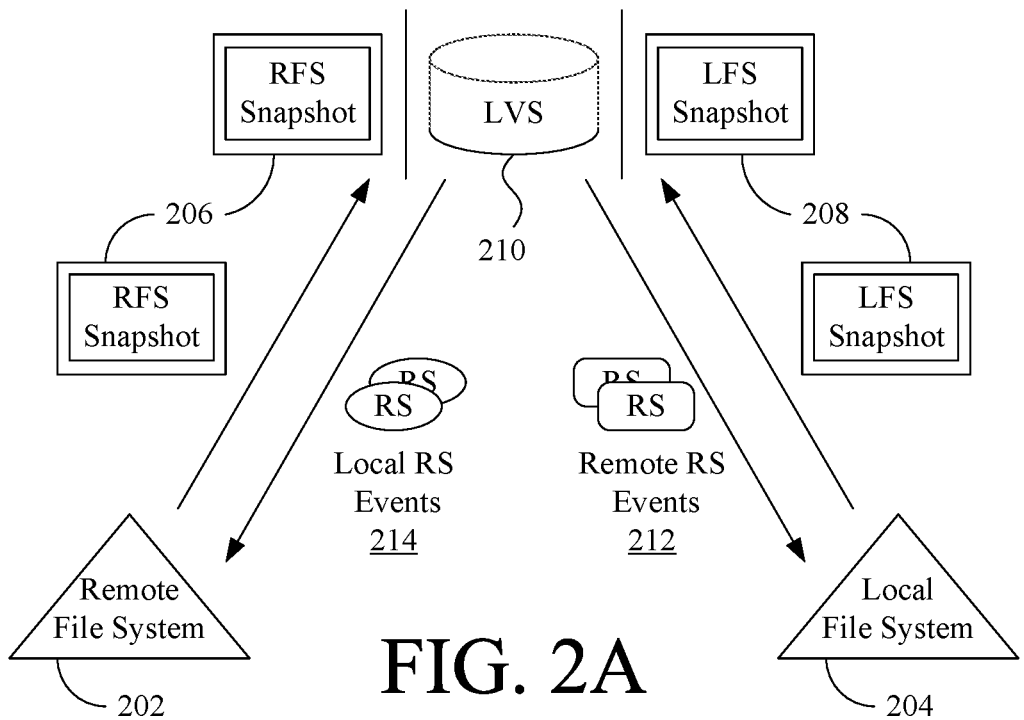
FIG. 2A is a relational diagram illustrating exemplary snapshot-based synchronization processes employed by the cloud computing system of FIG. 1.
Figure 2B:
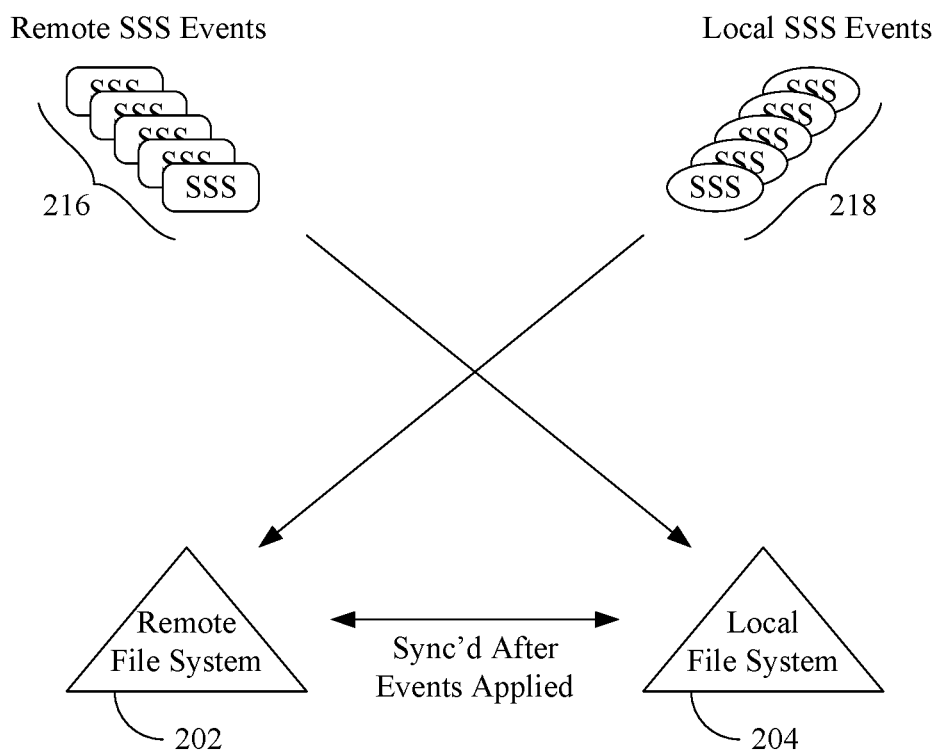
FIG. 2B is a relational diagram illustrating an exemplary steady-state synchronization process employed by the cloud computing system of FIG. 1.

With reference to FIGS. 2A-2B, synchronization is the process of making a remote file system (RFS) 202 stored on remote cloud 102 and a local file system (LFS) 204 stored on local cloud 104 the same or nearly the same. RFS 202 and LFS 204 are each defined by metadata (defining the file system's namespace and object attributes) and data (e.g., associated file data). Thus, after synchronization, the metadata and file data of RFS 202 and LFS 204 will be synchronized. Different types of synchronization routines are used with the present invention and include, but are not limited to, snapshot-based synchronization and steady-state synchronization.

FIG. 2A illustrates snapshot-based synchronization of all or specific portions of RFS 202 and LFS 204 utilized by cloud computing system 100. According to snapshot-based synchronization, metadata snapshots 206 and 208 of RFS 202 and LFS 204, respectively, are obtained at some time $T_s$. The attributes in snapshots 206 and 208, and optionally in a last valid sync (LVS) database 210 (described below), are compared and the differences are used to generate remote rescan (RS) events 212 and local RS events 214. Remote RS events 212 represent differences between RFS 202 and LFS 204 that need to be applied to LFS 204, whereas local RS events 214 represent differences between LFS 204 and RFS 202 that need to be applied to RFS 202. The remote and local RS events 212 and 214 are then applied to the opposite file systems using file system operations that will synchronize RFS 202 and LFS 204 as of time $T_s$.

There are several types of snapshot-based synchronizations, including a Full File System (FFS) synchronization, a Full Rescan Synchronization (FRS), and a Limited Rescan Synchronization (LRS). FFS synchronization is used when RFS 202 and LFS 204 are synchronized for the first time (e.g., when an account is opened, etc.). As part of the FFS synchronization, LVS database 210 is populated. LVS database 210 stores extended attributes about each file system object (e.g., files and folders) that has been successfully synchronized. Entries in LVS database 210 are created, updated, or removed as file system objects are synchronized.

After the initial FFS synchronization, FRS and LRS can be used to resynchronize all or parts of RFS 202 and LFS 204. Because FRS and LRS operate similarly, they are referred to herein as simply a rescan synchronization (RS). A FRS is used to re-synchronize the entire synchronized portions of LFS 204 and RFS 202. A FRS is the same as a FFS except that new RFS and LFS snapshots 206 and 208 are taken and compared with the extended attributes in LVS database 210 when generating the RS events 212 and 214. The comparison using LVS database 210 prevents files and folders that are still in sync from being synchronized again, but the FRS is still very time consuming especially for large namespaces. An LRS is similar to an FRS but only takes place on limited portions (e.g., only for specific file and folder paths) of the synchronized namespace.

The RS processes described above can take a very long time to complete (e.g., several days), particularly in the case of an FRS. Therefore, it is desirable to avoid rescan synchronizations, and instead, utilize steady-state synchronization, which is readily scalable and utilizes resources more efficiently than rescan synchronizations.

FIG. 2B illustrates a steady-state synchronization (SSS) routine employed by cloud computing system 100. SSS is based on monitoring and collecting all of the changes (events) made to LFS 204 (e.g., by local clients 110) and all of the changes made to RFS 202 (e.g., by remote clients 116) as they occur, for example, between some point in time, $T_1$, and a later time, $T_2$. SSS events associated with changes made to RFS 202 and LFS 204 are called "remote" SSS events 216 and "local" SSS events 218, respectively. The remote SSS events 216 and local SSS events 218 are then processed such that appropriate file system operations are generated and applied to LFS 204 and RFS 202 to synchronize RFS 202 and LFS 204 as of time $T_2$. The time period between $T_1$ and $T_2$ is called an event synchronization period. LVS database 210 is updated as SSS events are processed and synchronizations of file system objects are completed, so that LVS database 210 is up-to-date for use during rescan synchronizations. Thus, the SSS process of FIG. 2B can be used to keep RFS 202 and LFS 204 in synchronization after the initial FFS or subsequent FRS, as data monitoring processes will be recording SSS events on remote cloud server 102 and local cloud server 104, and storage synchronizer 120 causes consecutive SSS's to be performed based on the recorded events.

Additional information regarding snapshot-based synchronization and steady state synchronization is described in U.S. Publication No. 2016/0299917 A1, dated Oct. 13, 2016 by Koos et al. and entitled "System and Method for Delete Fencing During Synchronization of Remote and Local File Systems", which is incorporated by reference herein in its entirety.

Occasionally a request will be made for synchronization services in progress by storage synchronizer 120 to be terminated and restarted. Such a termination and restart can occur for a variety of reasons, including an administrator restarting local cloud 104, a software upgrade, a related program needing to interrupt the synchronization, a software bug requiring system restart, etc. When an SSS in progress is terminated, storage synchronizer 120 advantageously persists at least some restart information to non-volatile memory, which is then used to optimize the synchronization of RFS 202 and LFS 204 on service restart. More particularly, storage synchronizer 120 is configured to save an indication of the current SSS's progress when terminated and to cause a follow-up SSS to begin where the prior SSS left off after the synchronization services restart.

Figure 3A:
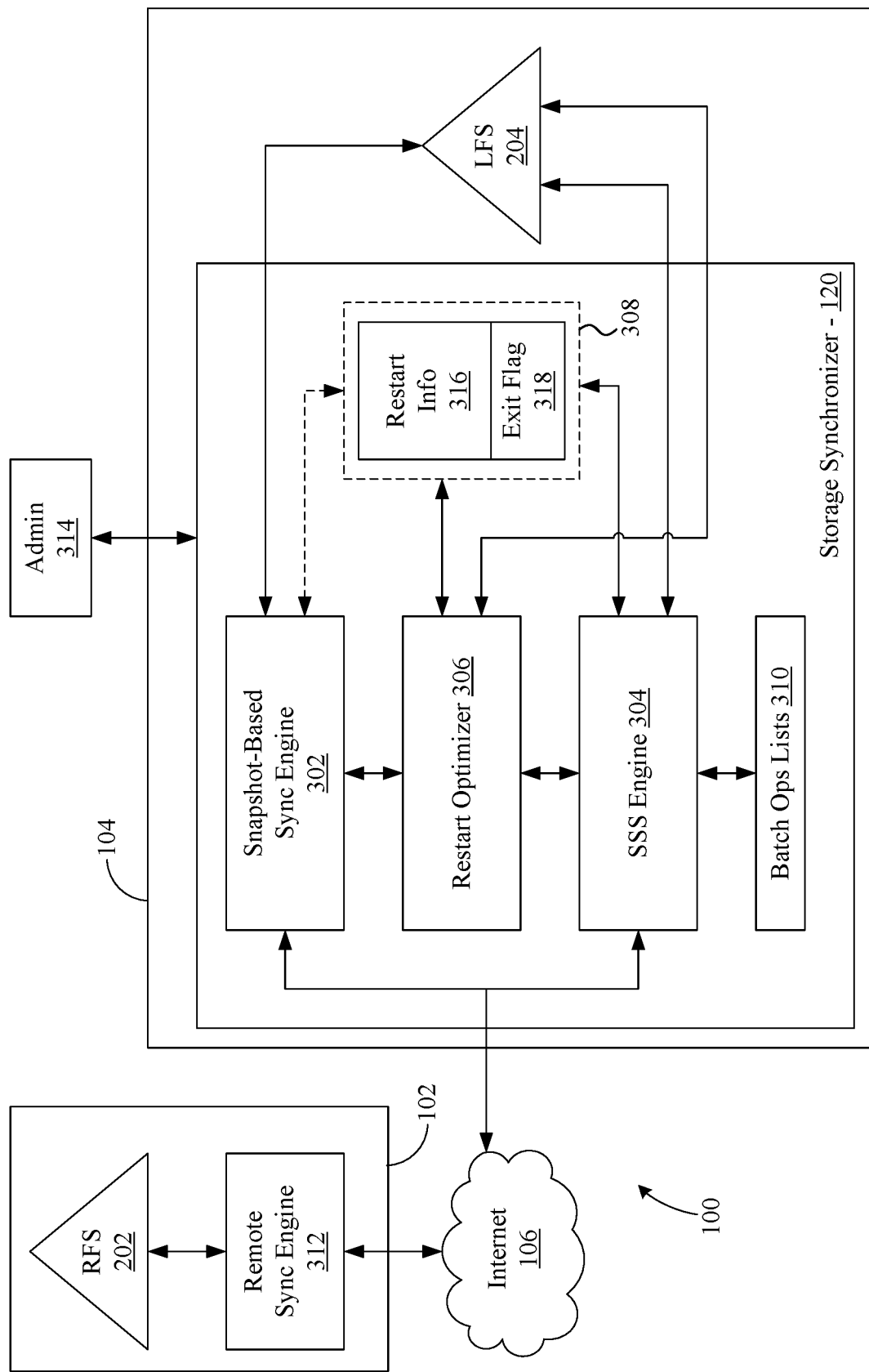
FIG. 3A is a relational diagram showing restart optimization aspects of the cloud computing system of FIG. 1.

FIG. 3A is a relational diagram showing the restart optimization aspects of the cloud computing system 100 in greater detail. Storage synchronizer 120 includes a snapshot-based sync engine 302, a steady state sync (SSS) engine 304, a restart optimizer 306, configurable operation parameters 308, and a plurality of batch operations lists 310.

Each of sync engines 302 and 304 communicates with remote cloud 102, for example, via a remote cloud interface (not shown). Sync engine 302 collects snapshots of RFS 202 via internet 106 and of LFS 204 directly, and compares the snapshots to generate file system operations to be applied to RFS 202 and LFS 204. Sync engine 302 performs the appropriate file system operations on LFS 204 and provides the remaining operations to remote cloud 102 for application to RFS 202. SSS engine 304 processes remote SSS events, received from RFS 202, and local SSS events generated locally by local cloud 104, and generates file system operations therefrom to be applied to RFS 202 and LFS 204. SSS engine 304 provides file system operations for remote file system objects to remote cloud 102 for application to RFS 202 and applies file system operations for local file system objects to LFS 204.

A remote sync engine 312 on remote cloud 102 takes snapshots of RFS 202 and provides the snapshots to storage synchronizer 120 for use by snapshot-based sync engine 302. Remote sync engine 312 also collects and provides remote SSS events to storage synchronizer 120 for use by SSS engine 304. Remote sync engine 312 further receives file system operations from storage synchronizer 120 and applies those file system operations to RFS 202.

Sync services provided by storage synchronizer 120 can be terminated, for example, when an administrator 314 voluntarily terminates the synchronization services, local cloud 104 is rebooted, when a software update is installed, etc. When termination occurs, restart optimizer 306 utilizes operational parameters 308 to optimize synchronization on restart.

Operational parameters 308 are shown to include restart information 316 and an exit flag 318. Restart information 316 includes various data shown in FIG. 3B. Storage synchronizer 120 (e.g., via restart optimizer 306, etc.) persists at least some of the restart information 316 in LFS 204 (or some other stable, non-volatile memory) prior to storage synchronizer 120 restarting. Accordingly, one or more modules of storage synchronizer 120 can retrieve the persisted restart information 316 after storage synchronizer 120 has restarted. Exit flag 318 stores data indicating whether a request to terminate the current synchronization has been received. Upon receiving a termination signal from administrator 314 or some other process (e.g., a software update), storage synchronizer 120 sets exit flag 318 to indicate that services are being terminated. In some embodiments, exit flag 318 might be set by some other process, such as a master process or caller of local cloud 104.

In response to exit flag 318 being set, restart optimizer 306 determines which type of synchronization will be triggered on restart based on the type of synchronization process being interrupted. If an SSS is interrupted, then restart optimizer 306 causes an SSS to be triggered on restart and modifies restart information 316 such that the restarted SSS will continue from the point where the terminated SSS left off. If an FRS or LRS is being terminated, then restart optimizer 306 causes an FRS to be triggered on service restart, for example, by modifying restart information 316 to indicate the type of sync being interrupted. Similarly, if an FFS is being terminated, restart optimizer 306 causes an FFS to be triggered on service restart, for example, by modifying restart information 316 to so indicate. If no synchronization is in-progress when exit flag 318 is set (e.g., storage synchronizer 120 is in between consecutive SSS processes, etc.), restart optimizer 306 can optionally trigger a new SSS on restart if additional SSS events have been received, take no action until a synchronization is started by storage synchronizer 120, etc.

When synchronization is restarted, restart optimizer 306 accesses the persisted restart information 316 from LFS 204, determines the appropriate type of synchronization process to begin, and then instructs the appropriate one of sync engines 302 and 304 to begin the determined synchronization process. In the case of a continued SSS, restart optimizer 306 causes SSS engine 304 to continue the continued SSS from point where the prior SSS was terminated based on the restart information 316. If the interrupted synchronization was a FFS, then restart optimizer 306 triggers a FFS on restart via sync engine 302. If the interrupted synchronization was a FRS or LRS, restart optimizer 312 triggers a FRS on restart, also via sync engine 302.

FIG. 3A also shows that at least SSS engine 304 utilizes batch operations lists 310 to improve performance when file system operations are being processed for application to RFS 202 or LFS 204. More specifically, some file system operations generated by SSS engine 304 are added to a particular one of batch operations lists 310 (instead of being immediately applied), depending on predefined criteria (e.g. size, a type of operation, etc.). However, operations that do not meet the predefined criteria to be added to a batch list are applied to LFS 204 or provided to RFS 202 at the time of processing. Batch operations lists 310 advantageously limit the number of network calls that need to be made, particularly to remote cloud 102, because all the operations on a particular list are flushed (applied) responsive to one network call. Flushing a batch operations list 310 can be done in response to different criteria such as, for example, the current SSS process being terminated, a list reaching a predetermined size (e.g. number of operations, data size, etc.), when a particular type of operation is encountered, receiving a request from remote cloud server 102, etc.

Figure 3B:
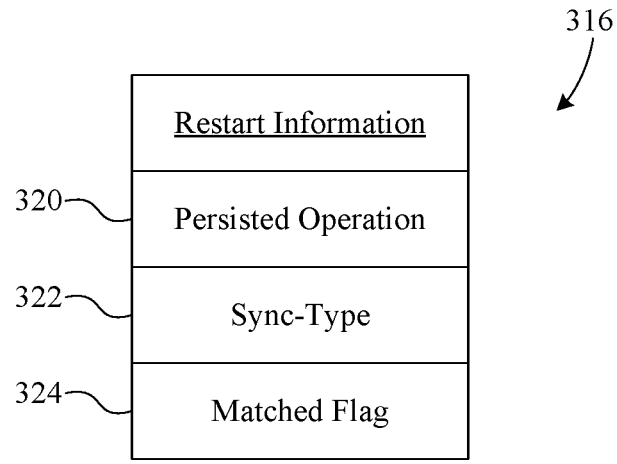
FIG. 3B is data structure showing the restart information of FIG. 3A in greater detail.

FIG. 3B is a data structure showing restart information 316 in greater detail. Restart information 316 defines useful restart information and, in this particular embodiment, includes persisted operation data 320, a sync-type field 322, and a matched flag 324. Persisted operation data 320 includes data indicative of at least one operation persisted from an interrupted SSS. Persisted operation data 320 can be stored, for example, in JSON format. Persisted operation data 320 is used when continuing a previously interrupted synchronization to determine which operation to continue synchronization from in the continued SSS. Sync-type field 322 stores data (e.g., binary-coded data) indicating the type of synchronization that was interrupted, if any. Matched flag 324 stores data indicating whether the persisted operation stored as persisted operation data 320 has been matched (after restart) to a file system operation generated during a continued SSS synchronization. Although persisted operation data 320, sync-type data 320, and matched flag 324 are shown together in table 316, they need not be stored in a common location or even on a common device.

Restart optimizer 306 stores at least persisted operation data 320 in LFS 204 (or other stable memory) between restarts when an SSS is interrupted. Restart optimizer 306 can determine that an SSS was interrupted previously when persisted operation data 320 is present on restart. However, in this embodiment, restart optimizer 306 also persists data in sync-type field 322 between restarts, so restart optimizer 306 can determine which type of snapshot-based sync was previously interrupted and, therefore, which type of synchronization to trigger after restart. Matched flag 324 is used during each continued SSS and is reset (e.g., by restart optimizer 306, SSS engine 304, etc.) to a predetermined value (e.g., false) at the beginning of each continued SSS. Therefore, persisting matched flag 324 between synchronizations is optional. After a synchronization or continued synchronization completes successfully, restart optimizer 306 clears restart information 316.

Figure 3C:
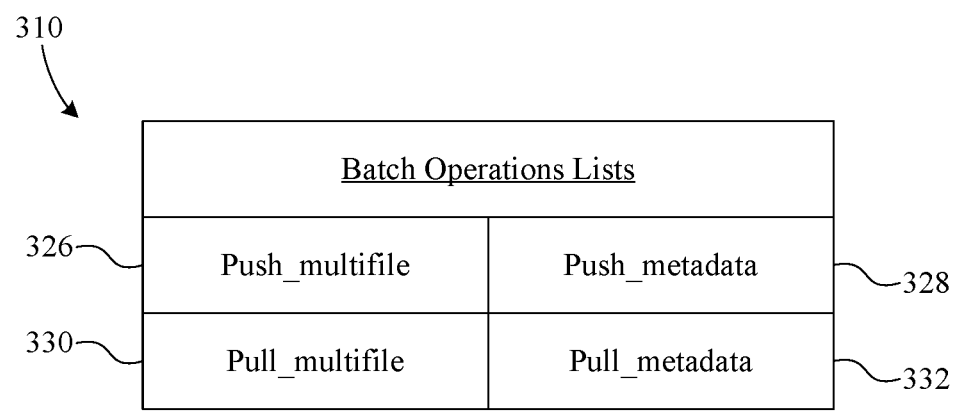
FIG. 3C is a table showing exemplary batch operation lists utilized by the storage synchronizer of FIG. 3A to perform steady state synchronization.

FIG. 3C shows batch operations lists 310 utilized by SSS engine 304 to perform steady state synchronizations. Batch operations lists 310 include a push_multifile list 326, a push_metadata list 328, a pull_multifile list 330, and a pull_metadata list 332. Each of batch operations lists 310 includes file system operations of particular type(s). Push_multifile list 326 includes push_file operations, which represent operations that push files (or portions thereof) on LFS 204 to RFS 202, and cause corresponding file changes to be applied to RFS 202. Push_metadata list 328 includes lmove_file, ldelete_file, lmove_folder, ldelete_folder, and push_folder operations, which correspond to changes to file and folder metadata on LFS 204 and cause corresponding changes to file and folder metadata on RFS 202. Pull_multifile list 330 includes pull_file operations, which pull files (or portions thereof) from RFS 202 to LFS 204, and cause corresponding file changes to be applied to LFS 204. Pull_metadata list 332 includes pull_folder operations, which correspond to changes to folder metadata on RFS 202 and cause corresponding changes to folder metadata on LFS 204.

Figure 3D:
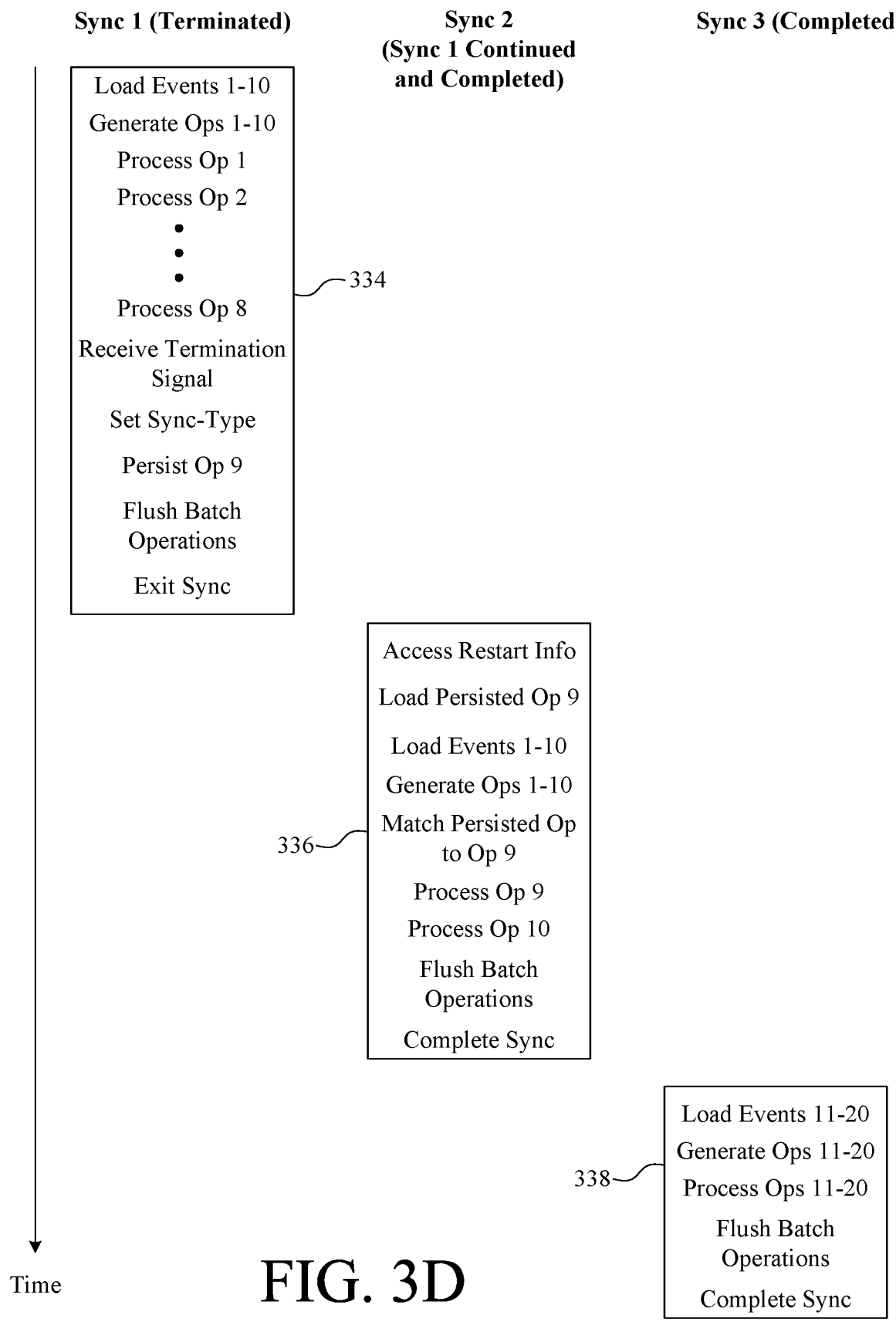
FIG. 3D is a timing diagram illustrating the relative timing of file system actions during three sequential synchronization processes: a terminated synchronization, a continued synchronization to completion, and a subsequent complete synchronization.

The operation of storage synchronizer 120 during sequential SSSs will now be described with reference to FIGS. 3A-3D. FIG. 3D is a timing diagram illustrating the relative timing of synchronizer actions during three sequential SSS processes: a terminated SSS 334 ("Sync 1"), a continued SSS 336 ("Sync 2"), and a complete SSS 338 ("Sync 3").

When sync 334 begins, SSS engine 304 loads a new set of SSS events (numbered 1-10) from event databases, which are used to store SSS event records (described further below). Events 1-10 are associated with some synchronization period, for example, the time between the start of synchronization 334 and the start of a prior synchronization. Next, SSS engine 304 generates a sequence of operations (numbered 1-10) based on the SSS events 1-10. Then, SSS engine 304 sequentially processes each operation. Processing the operations includes one or more of applying an operation to LFS 204, providing an operation to remote cloud 102 for application to RFS 202, and updating a corresponding one of batch operations lists 310 to include the operation for later application.

Before each operation is processed, SSS engine 304 determines the termination status of storage synchronizer 120. In the present embodiment, SSS engine 304 queries restart optimizer 306 for the status of exit flag 318. In other embodiments, SSS engine 304 checks the status of exit flag 318 directly. Because exit flag 318 was not set prior to Ops 1-8, SSS engine 304 applied each of Ops 1-8 sequentially.

Prior to processing Op 9, a termination signal is received by storage synchronizer 120 and exit flag 318 is set. Accordingly, when SSS engine 304 requests the termination status when processing Op 9, restart optimizer 306 indicates to SSS engine 304 that the SSS is being terminated. Additionally, restart optimizer 306 requests the current operation (in this case Op 9) being processed by SSS engine 304. Restart optimizer 306 receives the current operation from SSS engine 304 and stores the operation in persisted operation data field 320 of restart information 316. Restart optimizer 306 also sets sync-type field 322 to indicate that the current sync is an SSS. (In an alternative embodiment, restart optimizer 306 can store the current sync type in sync-type field 322 when a sync is first initiated, instead of in response to exit flag 318 being set.)

When SSS engine 304 receives the indication of termination, SSS engine 304 provides its current operation (Op 9) to restart synchronizer 306, such that restart synchronizer 306 can stores it as part of restart information 316. SSS engine 304 also flushes batch operation lists 310 by providing and/or applying any pending batch operations from those lists 310 to the corresponding one of RFS 202 and/or LFS 204 before exiting the SSS synchronization 334. After the batch operation lists 310 have been flushed and the current operation saved as persisted operation 320, SSS engine 304 stops service.

Continued synchronization 336 is a continuation of terminated synchronization 334. When synchronization services are restarted (e.g., by admin 314), exit flag 318 is cleared and the persisted restart information 316 is accessed by restart optimizer 306. Restart optimizer 306 determines the current sync-type should be SSS at least because there is a stored SSS operation 320. The persisted sync-type flag 320 also indicates the previously-terminated synchronization was an SSS. Restart optimizer 306, therefore, instructs SSS engine 304 to load the persisted operation (Op 9) and to begin a continued SSS based on the existing events 1-10.

Accordingly, SSS engine 304 loads the same events (events 1-10) used to generate operations for the terminated synchronization 334 and generates the same operations (Ops 1-10) for continued sync 336. Then, SSS engine 304 compares the persisted operation (Op 9) to each of regenerated operation 1-10 in sequence. Any of the regenerated operations that do not match the persisted operation 320 are skipped or discarded. Once the persisted operation 320 is matched with the regenerated Op 9, then SSS engine 304 sets matched flag 324 to "True" and continues to process the remaining operations, including the operation matched to the persisted operation (here Ops 9 and 10). Thereafter, SSS engine 304 flushes batch operations from batch operations lists 310 (if any), before completing continued synchronization 336. When the SSS 336 completes, restart optimizer 306 clears restart information 316.

Syncs 334 and 336 illustrate how the restart information 316, particularly the persisted operation 320 (Op 9), identifies the point at which a particular sequence of file system operations (Ops 1-10) is split into a first portion and a second portion. The first portion includes operations (Ops 1-8) that were successfully applied to RFS 202 of LFS 204, whereas the second portion includes operations (Ops 9-10) that were not applied before service was terminated. Complete synchronization 338 is an uninterrupted SSS synchronization. Because there was no persisted restart information 316, SSS engine 304 loads a new set of events (events 11-20), and generates a new set of file system operations (Ops 11-20) from those events. Next, SSS engine 304 processes the set of operations in sequence and flushes any pending batch operations, before completing synchronization 338.

The events and operations are numbered between 1 and 20 for ease of illustration. Typically, the number of SSS events and file system operations processed by SSS engine 304 will number in the thousands or more. Additionally, SSS engine 304 performs a large number of operations while carrying out an SSS. Most of these operations are not shown for brevity and clarity.

Figure 4:
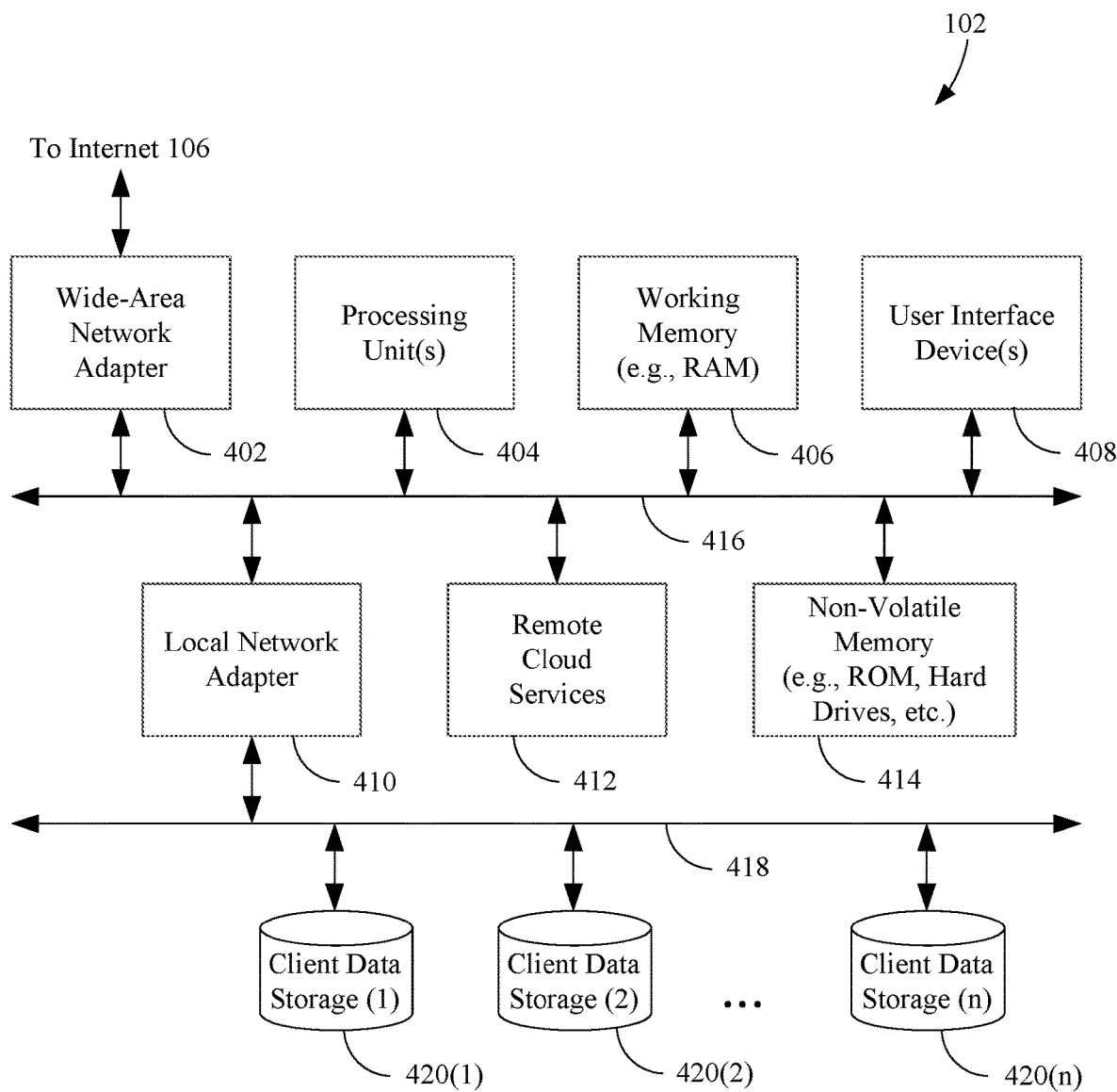
FIG. 4 is a block diagram showing the remote cloud of FIG. 1 in greater detail.

FIG. 4 is a block diagram showing remote cloud 102 in greater detail. Remote cloud 102 includes a wide-area network adapter 402, one or more processing units 404, working memory 406, one or more user interface devices 408, a local network adapter 410, a remote cloud services component 412, and non-volatile memory 414, all intercommunicating via an internal bus 416. Processing units(s) 404 impart functionality to remote cloud 102 by executing code stored in any or all of non-volatile memory 414, working memory 406, and remote cloud services 412. Remote cloud services 412 represents hardware, software, firmware, or some combination thereof, that provides the synchronization and other functionality of remote cloud 102 described herein.

Wide area network adapter 402 provides a means for remote cloud 102 to communicate with remote clients 116 and local clouds 104 and 114 via Internet 106. Local network adapter 410 provides a means for accessing a plurality of data storage devices 420(1-n), via a private network 418. Clients' files are stored in and retrieved from data storage devices 420(1-n) as needed. Additional data storage devices 420(n+) can be added as needed to provide additional storage capacity. In this example embodiment, data storage devices 420(1-n) are network attached storage (NAS) devices, but any suitable type of storage device can be used.

Cloud-based object storage infrastructures are further described in U.S. Publication No. 2014/0149794 A1, dated May 29, 2014 by Shetty et al. and entitled "System And Method Of Implementing An Object Storage Infrastructure For Cloud-Based Services", which is incorporated herein by reference in its entirety.

Figure 5:
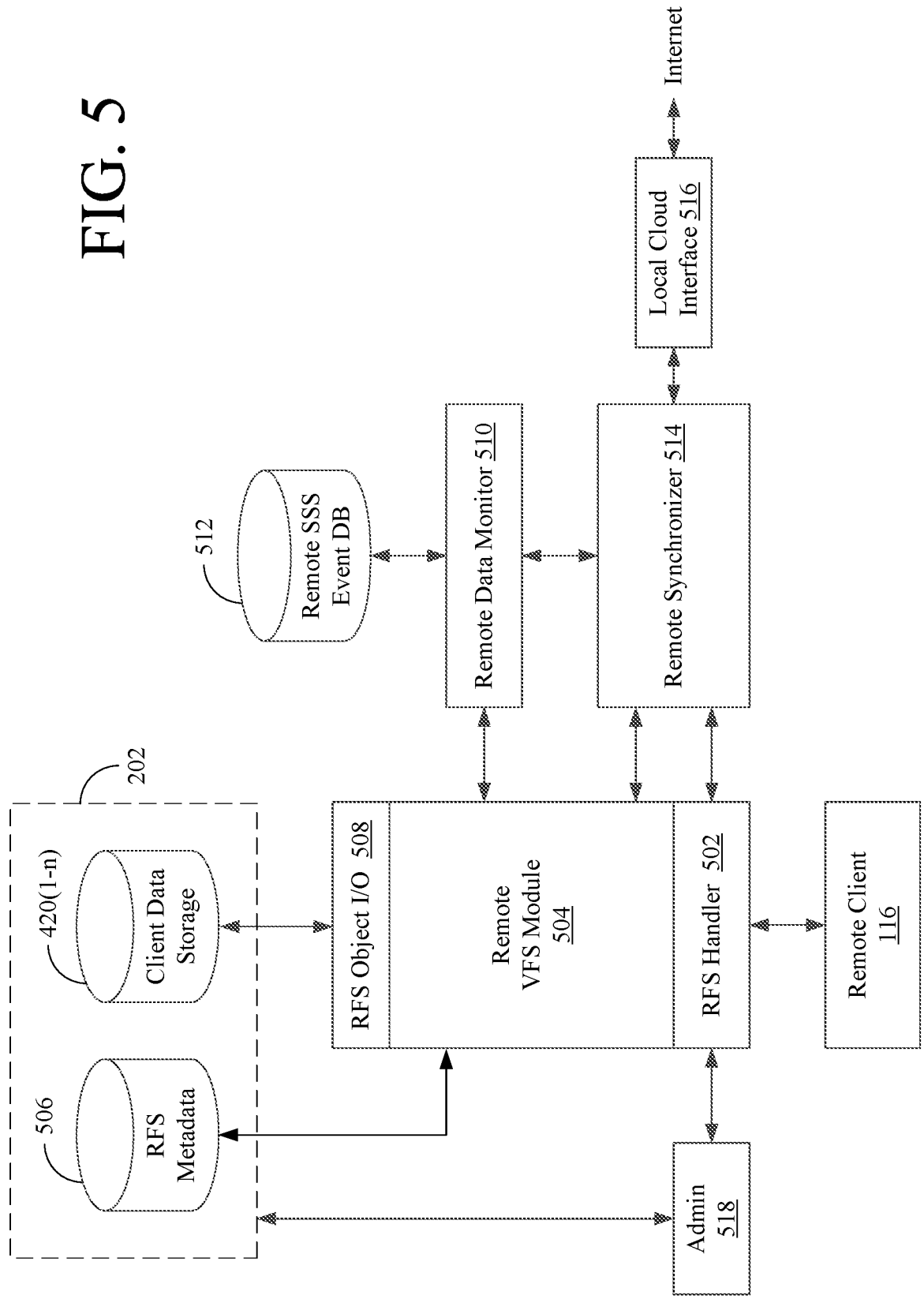
FIG. 5 is a relational diagram showing functional aspects of the remote cloud of FIG. 1.

FIG. 5 is a relational diagram showing the functional aspects of remote cloud 102 in greater detail. In the illustrated embodiment, the functional aspects are provided by remote cloud services 412 but could be distributed across other service modules or even other machines as desired.

Remote client 116 is a device and/or process used to access files in RFS 202 via an RFS handler 502. RFS handler 502 represents an interface/protocol (e.g., HTTP, WebUl, WebDAV, RESTful application program interfaces (APIs), etc.) by which remote clients 116 can access and modify RFS 202. Responsive to communication with remote client 116, RFS handler 502 calls remote virtual file system (VFS) module 504, which facilitates access to RFS 202. Remote VFS module 504 provides remote client 116 with file and folder access to RFS 202, for example, after authenticating remote client 116 and determining that access is permitted. RFS object I/O module 508 manages the I/O subsystem for organized data file storage and access on data storage devices 420(1-n).

As shown in FIG. 5, RFS 202 includes both an RFS metadata database 506 and data files stored on data storage devices 420(1-n). Metadata database 506 stores metadata (e.g., data defining virtual files and folders, permissions, etc.) that describes a hierarchical, virtual file system that remote client 116 can use to access file system objects and make changes to RFS 202. Data files associated with file object metadata are stored in data storage devices 420(1-n).

Remote VFS module 504 facilitates event-based, steady state synchronization between RFS 202 and LFS 204 by trapping information regarding any changes made to RFS 202 as they occur (e.g., when changes are made to the virtual file system by client 116) and providing remote SSS event information to a remote data monitor 510. For each remote SSS event 216, remote data monitor 510 receives the remote SSS event information from remote VFS module 504 and records the remote SSS event 216 in a remote SSS event database 512.

Remote synchronizer 514 controls and coordinates the synchronization process between remote cloud 102 and local cloud 104 on the remote cloud side. For example, remote synchronizer 514 can receive commands from local cloud 104 via local cloud interface 516 to initiate synchronization. In response, remote synchronizer 514 can request remote SSS events 216 from RFS data monitor 510, receive the remote SSS events 216, and provide the remote SSS events 216 to local cloud 104 via local cloud interface 516. In still other embodiments, remote synchronizer 514 can contact local cloud server 104 via interface 516 and initiate the synchronization process, for example, in response to remote SSS event accumulation, a command from a remote cloud administrator 518, etc. Remote synchronizer 514 can also trigger storage synchronizer 120 on local cloud 104 to initiate an FRS in some instances, for example, where too many events have occurred since the last SSS.

Remote synchronizer 514 also facilitates the different snapshot-based RS processes discussed above in FIG. 2A. For example, responsive to a snapshot request received via local cloud interface 516, remote synchronizer 514 is operative to obtain the appropriate metadata snapshot of RFS 202 and provide the snapshot to local cloud 104. The snapshot be in any convenient format (e.g., flat file, comma separated value, XML, JSON, etc.).

For either synchronization type, remote synchronizer 514 is also operative to receive file system operations and data, including batch operations and data, for modifying RFS 202 from local cloud 104 via interface 516 and apply those file system operations to RFS 202, for example, via RFS handler 502. The synchronization operations represent changes to LFS 204 that are being applied to RFS 202 as part of the synchronization process. File system operations can include any file system operations that are recognized by the protocol(s) implemented by RFS handler 502 (e.g., push_file, pull_file, pull_folder, lmove_file, etc.). The applied file system operations, thus, cause changes in RFS metadata database 506 and/or client data stores 420(1-n) as part of the synchronization process of RFS 202 and LFS 204.

Finally, local cloud interface 516 is a means by which remote cloud server 102 can establish an internet connection with local cloud server 104 and intercommunicate as needed, for example, by HTTP, complementary application program interfaces (APIs), etc. In a particular embodiment, local cloud interface 516 maintains an open (always on) connection with local cloud 104 for efficient synchronization.

Figure 6:
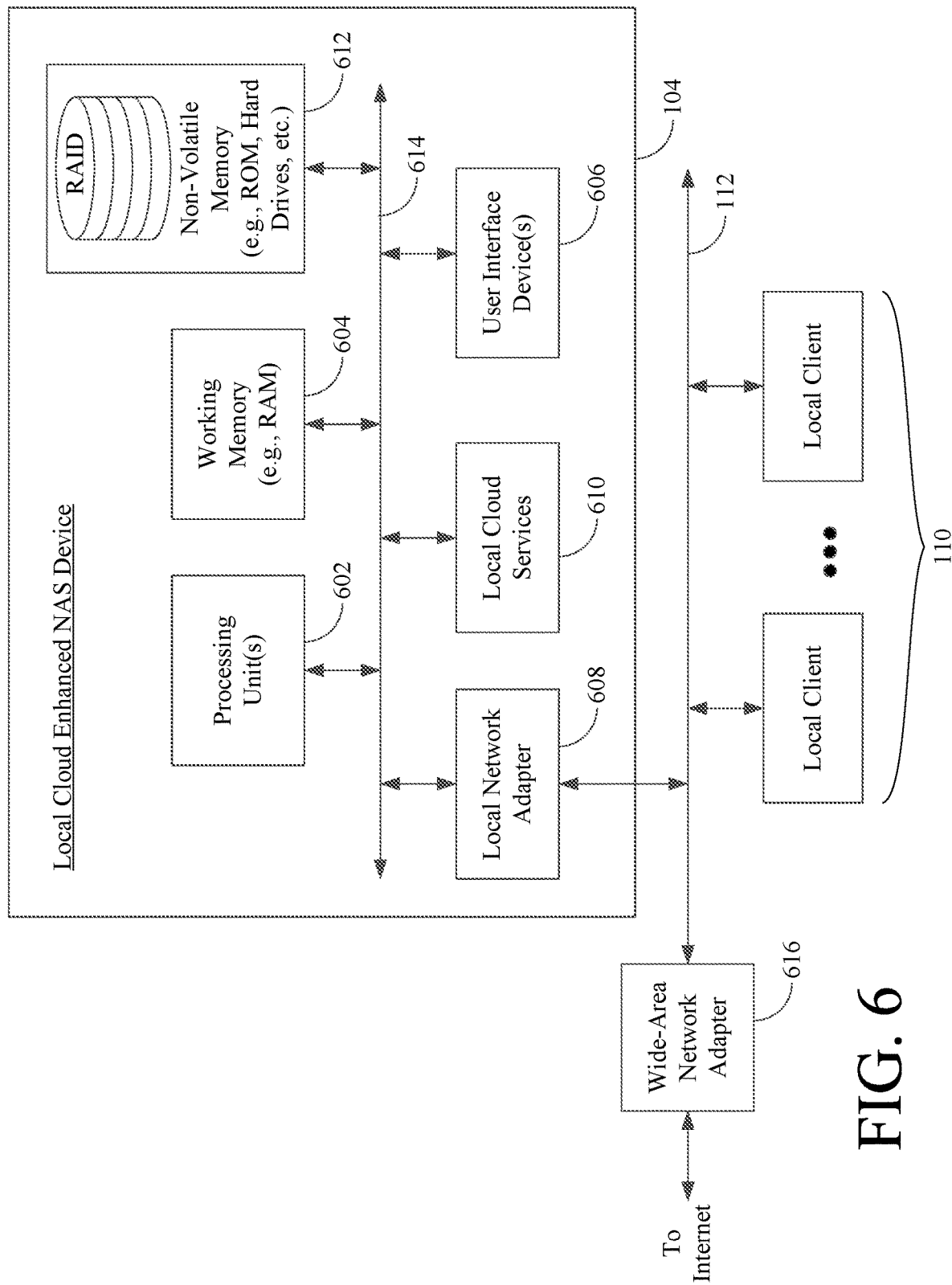
FIG. 6 is a block diagram showing the local cloud of FIG. 1 in greater detail.

FIG. 6 is a block diagram showing local cloud 104 in greater detail according to one embodiment of the present invention. In this embodiment, local cloud 104 is an enhanced network attached storage (NAS) device that includes one or more processing units 602, working memory 604, one or more user interface devices 606, a local network adapter 608, a local cloud services component 610, and non-volatile memory 612, all intercommunicating via an internal bus 614. Processing units(s) 602 impart functionality to local cloud server 104 by executing code stored in any or all of non-volatile memory 612, working memory 604, and local cloud services 610. A wide-area network adapter 616 facilitates communication with remote cloud server 102 (FIG. 1) via local network 112 and the Internet 106.

Non-volatile memory 612 also provides local file storage for LFS 204, persisted restart information 316, SSS event databases, etc. By way of example, non-volatile memory 612 is shown to include (in addition to other types of memory) a set of hard drives arranged in a RAID configuration. The local file system on the RAID drives can be accessed by local clients 110 via local network 112, as is known in the art, for example over a Server Message Block (SMB) connection. While a NAS device is used in this example of local cloud 104, local cloud 104 can also be implemented using a virtual machine (VM) running an operating system that allows file access over an SMB share.

Local cloud services 610 represents hardware, software, firmware, or some combination thereof, that provides the storage synchronization functionality described herein. Local cloud services 610 also provide file storage and retrieval services to local clients 110.

Figure 7:
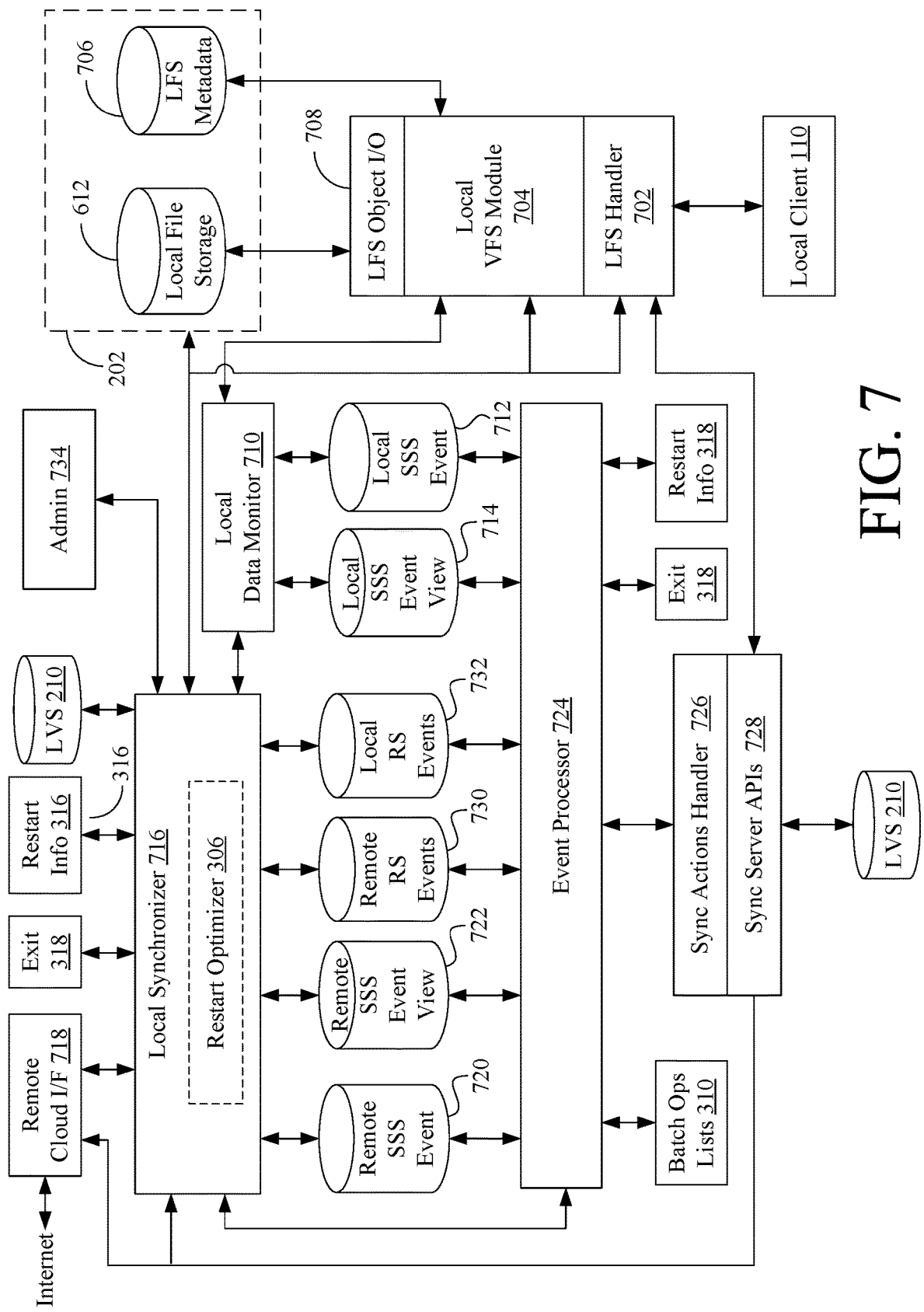
FIG. 7 is a relational diagram showing the functional aspects of the local cloud of FIG. 1.

FIG. 7 is a relational diagram showing functional aspects of local cloud 104 and storage synchronizer 120 in greater detail. However, in FIG. 7, the functional aspects of storage synchronizer 120 are embodied in the modules of FIG. 7 as more fully described below.

In FIG. 7, a local client 110 connects with an LFS handler 702 using an interface/protocol (e.g., Samba, CIFS, etc.) through which local client 110 can access and modify LFS 202. In a particular embodiment, LFS handler 702 implements Microsoft's CIFS protocol so that local client 110 can map the local file system as a network mapped drive. Responsive to local client 110, LFS handler 702 calls a local virtual file system (VFS) module 704.

Local VFS module 704 facilitates file and folder access to LFS 204 for a local client 110, for example, after authenticating the associated user. Local VFS module 704 receives the file system calls coming from local client 110 via LFS handler 702 and enforces permissions on file system access. Local VFS module 704 also monitors the actions of local clients 110 to detect changes being made to LFS 204 by the local users 110. When local VFS module 704 detects a change to LFS 204, local VFS module 704 modifies LFS metadata 706 to record the change. Additionally, an LFS object I/O module 708 manages the I/O subsystem for organized storage and access of data files stored in local file storage (non-volatile memory) 612 of LFS 204. Module 704 conveys data objects between LFS handler 702 and LFS Object I/O module 708.

Local VFS module 704 also helps record local SSS events 218. When module 704 detects a change to LFS 204 made by local client 110, local VFS module 704 provides local SSS event information to a local data monitor 710. Local data monitor 710 receives the local SSS event information for each event, and then creates a record of the local SSS event in a local SSS event database 712. Optionally, local data monitor 710 can also notify local synchronizer 716 of pending local SSS events in local SSS events database 712. Local data monitor 710 also copies/moves local SSS events associated with an event sync period (defined by local synchronizer 716) from database 712 to a local SSS event view database 714 for synchronization. The data structure for database 714 is the same as for database 712 for easy event transfer.

During normal operation of local cloud 104, local SSS event database 712 and local SSS event view database 714 are stored/cached in working memory 604 for fast operation and event processing. However, local data monitor 710 periodically saves the contents of local SSS event database 712 and local SSS event view database 714 to non-volatile memory 612 as part of LFS 202. Thus, the contents of local SSS event database 712 and local SSS event view databases 714 are persisted and saved when synchronization services are terminated and offline.

Local synchronizer 716 is responsible for overall coordination and control of the synchronization processes between the remote cloud 102 and the local cloud 104. Accordingly, local synchronizer 716 will periodically initiate SSS and snapshot-based synchronizations. For example, local synchronizer 716 can initiate an FFS when RFS 202 and LFS 204 are to be synchronized for the first time. Additionally, local synchronizer 716 can trigger an FRS (or an LRS in some cases) upon receiving such a request (e.g., from restart optimizer 306, from event processor 724, from remote cloud server 102, etc.).

Local synchronizer 716 can also initiate SSS in several ways, for example, responsive to pending SSS events in one of databases 712 and 714. It can also initiate synchronization periodically, for example, according to a time period defined by the client or by the system (e.g., every minute, every 15 minutes, etc.). As still another example, local synchronizer 716 can initiate synchronization upon receiving an instruction and/or remote SSS events from remote cloud 102 via a remote cloud interface 718. These and other methods of initiating synchronization will be apparent in view of this disclosure.

Local synchronizer 716 receives remote SSS events from remote cloud server 102 via remote cloud interface 718 and internet 106 and stores records of the remote SSS events 216 in a remote SSS event database 720. When an SSS is initiated, local synchronizer 716 copies/moves at least some of the remote SSS events (e.g., those associated with the current event synchronization period) from remote SSS event database 720 to a remote SSS event view database 722. The data structures for remote databases 512, 720, and 722 are the same in the present embodiment. Additionally, local synchronizer 716 periodically saves the contents of remote SSS event database 720 and remote SSS event view database 722 to non-volatile memory, for example as part of LFS 202, for retrieval after restart.

Local synchronizer 716 further coordinates and carries out parts of the snapshot-based synchronization processes. In particular, when a snapshot-based synchronization is initiated, local synchronizer 716 is operative to obtain an RFS snapshot 206 (e.g., the RFS Metadata 506) of RFS 202 and an LFS snapshot 208 (e.g., the LFS Metadata 706) of LFS 204 and store each of snapshots 206 and 208 in LFS 204 as a file. Local synchronizer 716 can request a metadata snapshot 206 of RFS 202 via remote cloud interface 718 and can obtain a metadata snapshot 208 of LFS 204 directly. Once the snapshots are obtained, local synchronizer 716 compares the snapshot files, generates remote and local RS events accordingly, and stores them in a remote RS events database 730 and in a local RS events database 732, respectively.

RS events and SSS events each include various types of file events and folder events. For example, File SSS events include, but are not necessarily limited to, creating a file, updating a file, deleting a file, and renaming (moving) a file. Folder SSS events include, but are not limited to, creating a folder, removing a folder, and renaming a folder. File RS events include, but are not limited to, creating a file, updating a file, and deleting a file. Folder RS events include, but are not limited to, creating a folder and removing a folder. In a particular embodiment, RS events do not include RENAME events. Additional information regarding RS and SSS event storage and data structures is described in U.S. Publication No. 2016/0299917 A1, which was previously incorporated by reference herein.

Local synchronizer 716 also communicates with and controls an event processor 724, which processes RS and SSS events depending on the type of synchronization, and generates file system operations for applying to RFS 202 and LFS 204 to complete the synchronization. For example, local synchronizer 716 can instruct event processor 724 to execute a snapshot-based synchronization. Likewise, local synchronizer 716 can instruct event processor 724 to execute an SSS for a particular event synchronization period. Local synchronizer 716 can also receive communications from event processor 724. For example, event processor 724 can notify synchronizer 716 that event processing is completed for a particular synchronization. Local synchronizer 716 and event processor 724 can also communicate instructions and parameters relating to optimizing restarts therebetween as discussed previously.

Event processor 724 processes RS events and SSS events for synchronization, as will be described in more detail below. For a snapshot-based synchronization, event processor accesses the remote and local RS events stored in remote and local RS events database 730 and 732, respectively, and generates file system operations to be applied to RFS 202 and LFS 204 to synchronize the file systems. For an SSS, event processor 724 accesses SSS events associated with an event synchronization period from local SSS event view database 714 and remote SSS event view database 722, processes the remote and local SSS events to reduce their number and resolve conflicts, and then generates the appropriate file system operations.

Event processor 724 utilizes batch operations lists 310 at least during steady state synchronizations as discussed above. When processing file system operations for application to their appropriate file systems, event processor 724 processes the file system operations sequentially. For each operation, event processor 724 either outputs the file system operation to sync actions handler 726 to be applied to LFS 204 or sent to remote cloud 102, or alternatively, adds it to a corresponding one of batch operations lists 310. As mentioned above, batch operations lists 310 include a Push_multifile list 326, a Push_metadata list 328, a Pull_multifile list 330, and a Pull_metadata list 332. Optionally, only operations associated with small files are added to Push_multifile and Pull_multifile lists 326 and 330, such as those having file sizes less than or equal to 1 megabyte (MB).

Event processor 724 outputs the file system operations that it generates to sync actions handler 726. Sync actions handler 726 receives the file system operations and applies the file system operations to RFS 202 and LFS 204 using a set of sync server application program interfaces (APIs) 728. APIs 728 enable sync actions handler 726 to apply file system operations to LFS 204 via LFS handler 702, for example, with complementary APIs. APIs 728 also enable sync actions handler 726 to communicate RFS file system operations to RFS 202 via remote cloud interface 718 and internet 106. Remote cloud 102 receives the file system operations via local cloud interface 516 (FIG. 5), for example, via complementary APIs. Remote synchronizer 514 would then apply the received file system operations to RFS 202 via RFS handler 502. Sync actions handler 726, via APIs 728, is also operative to update LVS database 210 as paths are successfully synchronized. Once a path is successfully synchronized, sync actions handler 726 updates the corresponding record in LVS database 210.

File system operations that can be applied to RFS 202 and LFS 204 include file operations and folder operations. The file operations include, but are not limited to, pushing files and folders, pulling files and folders, moving (renaming) files and folders, deleting files and folders, etc.

Event processor 724 is also operative to flush batch lists 310 based on various criteria. For example, event processor 724 can flush a batch list when that batch list exceeds a predetermined size (e.g. 200 operations or 20 MB), when event processor 724 processes a file system operation that is dependent on (e.g., must occur after) operations contained in the associated batch operations list 310, etc. As another example, event processor 724 can flush the Push_metadata list 328 on each lmove_folder that is encountered, because an lmove_folder operation (a local folder move that needs to be applied to RFS) can take a long time for remote cloud 102 to complete if many child object records of the target folder need to be updated.

When a batch operations list 310 is flushed, event processor 724 provides the batch operations list(s) to sync actions handler 726, which applies associated file system operations to LFS 204 and/or creates a batch request for the associated list to remote cloud 102. Alternatively, sync actions handler 726 can provide the flushed batch lists to local synchronizer 716 to prepare the request to remote cloud 102. In a particular embodiment, the batch requests provided to remote cloud 102 are dictionaries of key/value pairs. In each request, each key is a pathway of the file/folder corresponding to the operation, and the value contains information associated with the particular operation. Batch responses from remote cloud 102 can also be dictionaries of key/value pairs, including a pathway, status code, an identifier, error code, etc. Sync actions handler 726 (or local synchronizer 716) can also clear batch operations lists 310 in the case of successful synchronization, trigger an FRS (e.g., in the case of a catastrophic error), resend at least a portion of the original request (e.g., in the case of a simple error), etc.

In addition to the synchronization services described above, local synchronizer 716 also enables SSSs to be interrupted by synchronization service restarts without triggering a follow-up FRS. More specifically, local synchronizer 716 includes a restart optimizer 306 that utilizes restart information 316 (FIG. 3B) to minimize the occurrence of FRS's on synchronization service restarts, as will be described in more detail below. First, however, additional description of event processor 724 is provided.

Figure 8A:
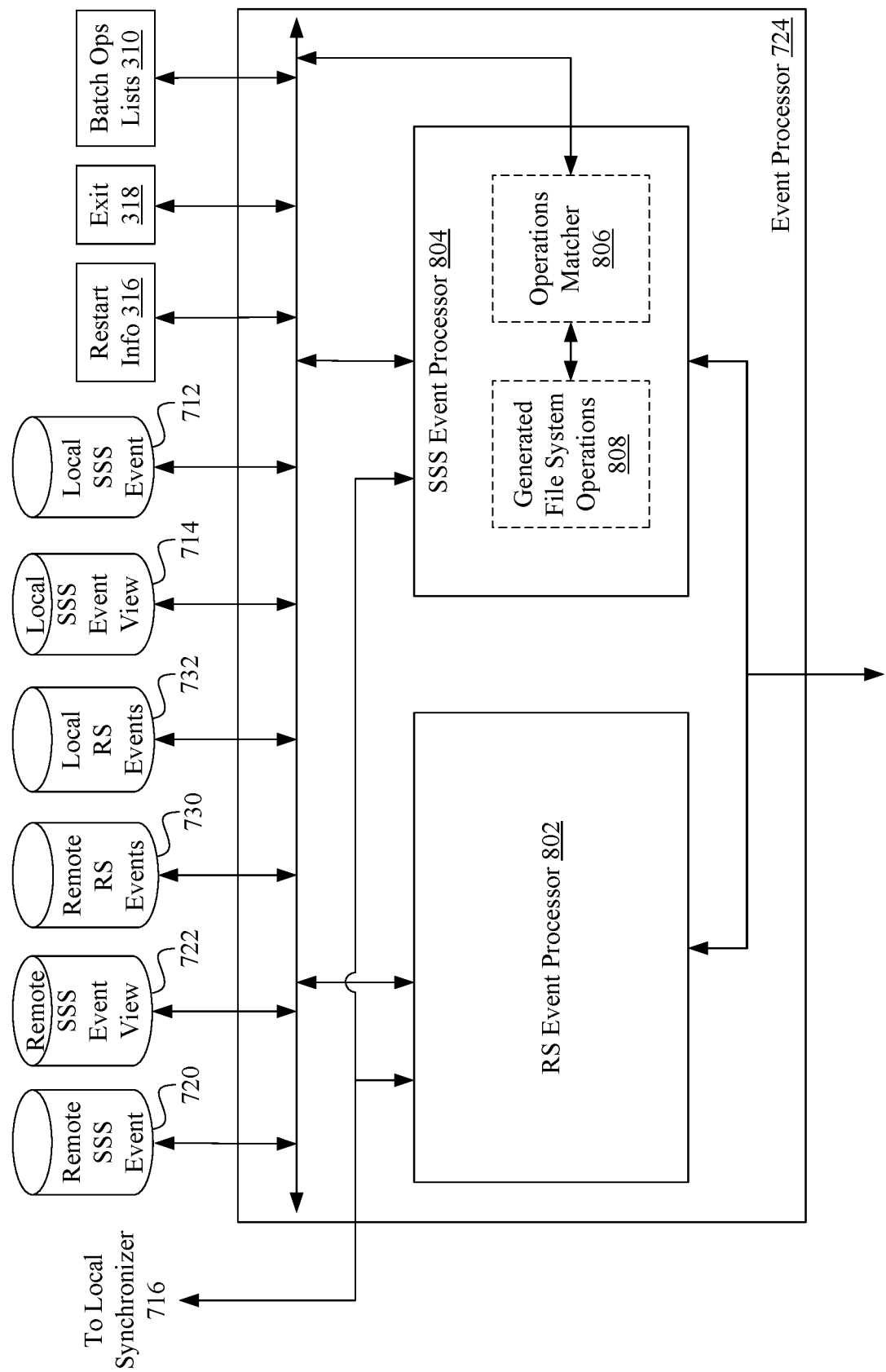
FIG. 8A is a relational diagram showing the functional elements of the event processor of FIG. 7 in greater detail according to one exemplary embodiment.

FIG. 8A is a relational diagram showing the functional elements of event processor 724 in greater detail. As shown, event processor 724 includes a RS event processor 802 and an SSS event processor 804. RS event processor 802 processes remote and local RS events 212 and 214 to generate file system operations associated with the snapshot-based synchronizations. Accordingly, RS event processor 802 has access to at least the RS events stored in remote and local RS events databases 730, and 732. RS event processor 802 also communicates with local synchronizer 716 regarding the snapshot-based synchronizations as discussed herein. Similarly, SSS event processor 804 processes remote and local SSS events stored in event view databases 722 and 714, respectively, to generate file system operations associated with a steady state synchronization. Additional information regarding RS and SSS event processing by processors 802 and 804, respectively, is described in U.S. Publication No. 2016/0299917 A1, which was previously incorporated by reference herein.

SSS event processor 804 generates file system operations 808 based on the SSS events in view databases 714 and 722 in predefined batches (e.g., 10,000 file system operations at a time). Thereafter, SSS event processor 804 sequentially processes the generated file system operations by determining whether to output each operation to sync actions handler 726, add the operation to one of batch operations lists 310, or persist the operation to restart information 316 in the case of a service termination. In a particular embodiment, push_file and pull_file operations corresponding to file sizes larger than 1 MB are output directly to sync actions handler 726. File system operations for smaller files are added to the corresponding ones of batch operations lists 310. SSS event processor 804 flushes batch operations from batch operations lists 310 whenever the lists become too large (e.g. larger than 200 operations and/or 20 MB), SSS event processor 804 encounters an operation having dependencies on one of batch operations lists 310, and/or upon receiving a termination signal as discussed above. SSS event processor 804 also communicates with local synchronizer 716 to accomplish the functions discussed herein, for example, to receive instructions to begin SSS event processing, to communicate with restart optimizer 306, to report errors, to request a rescan synchronization, etc.

SSS events processor 804 also includes an operations matcher 806, which facilitates matching a persisted operation 320 to an operation of a continued SSS. When performing a continued SSS after a terminated SSS, SSS event processor 804 loads the events from the previous synchronization from event view databases 722 and 714, and generates file system operations 808. Operations matcher 806 then attempts to match a persisted operation 320 with a regenerated file system operation. Operations matcher 806 checks each of file system operations 808 sequentially against persisted operation 320, skipping or discarding each operation 808 that does not match the persisted operation 320. When a match is found, then operations matcher 806 sets matched flag 324 to a predetermined value (e.g., true) to indicate the match. Once a match is found, SSS event processor 804 continues processing the file system operations 808 as normal, beginning with the persisted operation. Thus, SSS event processor 804 facilitates restarting a follow-up SSS from the point where the interrupted SSS left off.

Now with reference now to FIGS. 3B, 7, and 8A, consider that local synchronizer 716 has initiated a synchronization process using event processor 724. If a local administrator 734 (or some other process) thereafter requests local cloud services to be terminated (stopped), then local synchronizer 716 sets exit flag 318 to a value indicating that event processor 724 should discontinue its current synchronization. Additionally, local synchronizer 716 terminates LFS handler 702 (e.g., Samba), which stops local SSS event production because local clients 110 are no longer able to access LFS 202. Local synchronizer 716 further saves the contents of remote SSS event database 720 and remote SSS event view database 722 to LFS 202. Local synchronizer 716 also instructs data monitor 710 to save the contents of local SSS event database 712 and local SSS event view database 714 to LFS 202. Thus, remote and local SSS events are saved in non-volatile memory when local cloud 104 is offline and being restarted.

In response to exit flag 318 being set, restart optimizer 306 saves at least some restart information 316 to non-volatile memory 612 (e.g., in LFS 204) to determine how to proceed on the follow-up sync after local synchronizer 716 is restarted. If a pending snapshot-based synchronization is interrupted, then restart optimizer 306 stores sync-type data, indicating the type of synchronization, to sync-type field 322. On restart, if sync-type data 322 indicates that the terminated synchronization was a FFS, then restart optimizer 306 will trigger a new FFS on restart. However, if sync-type data 322 indicates that the interrupted synchronization was a FRS or a LRS, restart optimizer 306 will trigger a new FRS upon restart. In response to exit flag 318 being set, RS event processor 802 stops its synchronization process and exits.

If the current synchronization is an SSS, restart optimizer 306 persists operation data 320 for the current one of the file system operations 808 being processed by SSS event processor 804. When the operation data 320 is received from SSS event processor 804, restart optimizer 306 persists the operation data 320, along with the sync-type data 322 (indicating SSS), in LFS 204 as persisted restart information so as to trigger a continued SSS on restart from the persisted operation.

Before processing each of file system operations 808 for application to RFS 202 or LFS 204, SSS event processor 804 queries restart optimizer 306 to determine if a termination signal has been received. (Alternatively, SSS event processor 804 can check exit flag 318 directly). If no termination signal, then SSS event processor 804 applies the file system operation as usual. However, if a termination signal has been received, then SSS event processor 804 provides its current file system operation 808 being processed to restart optimizer 306, optionally in response to a query from restart optimizer 306, which stores it as persisted operation data 320. (Alternatively, SSS event processor 804 can write the persisted operation data 320 directly.) SSS event processor 804 further flushes all batch operations in batch operations lists 310. After all the batch operations have been flushed, all applied operations have completed, and the current operation has been persisted, SSS event processor 804 terminates the current SSS and exits pending restart.

In a particular embodiment, the persisted operation 320 is provided and saved as a JSON object, depending file or folder operation, as follows:

File Op: (opcode, (path, uqid, mtime, size, user, source_path), is_update, op_flags); or Folder Op: (opcode, (path, uqid, user, source_path), is_update, op_flags).

In the above "opcode" specifies the type of operation (e.g., one of pull_file, push_file, delete_file, ldelete_file, move_file, lmove_file for files; one of pull_folder, push_folder, delete_folder, ldelete_folder, move_folder, lmove_folder for folders; etc.), "path" corresponds to the path on which the operation is performed, "uqid" is a unique identifier of the path, "mtime" indicates the last modification time, "size" indicates the file size, "user" indicates the user initiating the operation, source path indicates the source path for move operations (otherwise empty), and "is_update" is a true/false field applicable to push_file and pull_file operations indicating whether the operation is an update (i.e. the file already exists).

Additionally, "op_flags" is a collection of operation flags that serve various purposes. Some operation flag examples include an operation timestamp, which can be used to convert the operation back into an event of different format associated with the timestamp, a file checksum such as SHA512, an "ntimes_failed" field to indicate the number of times the operation has failed to apply, a "target_merged" true/false field for "move_folder" operations indicating whether the target folder has been merged with another folder. Op_flags can even include a "sync_type" field, indicating the synchronization type corresponding to the operation. Thus, in a particular embodiment, persisted operation data 320 and sync-type data 322 can be persisted as part of the same object. In an even more particular embodiment, matched flag 324 can also form part of the persisted operation 320 data object.

When local cloud 104 restarts, the various modules shown in FIG. 7 are re-initialized. As part of this process, SSS event databases 712 and 720 and SSS event view databases 714 and 722 are restored (e.g., by local synchronizer 716 and local data monitor 710) to active memory with their same event contents as prior to restart. Local synchronizer 716 also restarts LFS handler 702 (Samba) such that LFS 202 is accessible to local clients 110 and local SSS event collection can resume. Thereafter, local synchronizer 716 begins synchronization using restart optimizer 306.

Restart optimizer 306 checks restart information 316, and uses the available restart information to resume the previous synchronization. In the present embodiment, if the persisted sync-type data 322 indicates an FFS was interrupted, restart optimizer 306 causes a FFS using RS event processor 802 to be initiated. Similarly, if the persisted sync-type data 322 indicates an FRS or LRS was interrupted, restart optimizer 306 causes a FRS using RS event processor 802 to be initiated. However, if a persisted operation 320 is present, then restart optimizer 306 causes a continued SSS to be initiated by SSS event processor 804. Restart optimizer 306 further provides the persisted operation information 320 to SSS event processor 804. (Alternatively, SSS event processor 804 could detect the persisted operation 320 itself.) Restart optimizer 306 also initializes the matched flag 324 to a first predetermined value (e.g., False), indicating the operation 320 has not yet been matched.

Thereafter, SSS event processor 804 attempts to continue the previous steady state synchronization by regenerating the file system operations 808 associated with the interrupted SSS by processing the local and remote SSS events in event view databases 714 and 722 from the interrupted SSS. Once the file system operations 808 for the event sync period are generated, operations matcher 806 sequentially checks the file system operations 808 against the persisted operation 320. When a match is found, operations matcher 806 sets the matched flag 324 and SSS event processor 804 resumes applying file system operations 808 normally, beginning with the matched operation. Once all of the remaining operations have been processed and the SSS completed, restart optimizer 306 clears restart information 316. Thereafter, local synchronizer 716 can initiate additional synchronizations, such as consecutive SSS's based on a predefined schedule. In the unlikely event that the persisted operation 320 cannot be matched to one of regenerated operations 808, SSS event processor 804 triggers an FRS directly with local synchronizer 716 because an error has occurred.

It is also possible that a continued synchronization is also itself interrupted. A continued synchronization can be interrupted at two different points: before the persisted operation 320 is matched and after the persisted operation 320 is matched. If the continued synchronization is interrupted before the persisted operation 320 is matched (i.e., exit flag 318 is set again before matched flag 324 is set), SSS event processor 804 simply terminates the continued synchronization and keeps the prior persisted operation stored as persisted operation 320. On the other hand, if the continued synchronization is interrupted after the persisted operation 320 is matched (i.e., exit flag 318 is set again after matched flag 324 is set), then SSS event processor 804 causes the current operation 808 of the continued synchronization to be stored as the new persisted operation 320. In both cases, SSS event processor 804 will be able to load the correct persisted operation 320 to continue the originally-interrupted SSS when the SSS is continued for the second time.

In the embodiments described thus far, the batch operations lists are flushed before an SSS is terminated. This is because the operations on the batch lists could have occurred long before the persisted operation in the sequence of operation 808. In an alternative embodiment, however, the batch operations lists 310 can be saved as persisted data as part of an SSS termination process. In the continued sync, the batch operations lists 310 can then be loaded and performed first, before matching the persisted operation 320. This alternative could speed up some shut-downs, at the expense of slower restarts.

Figure 8B:
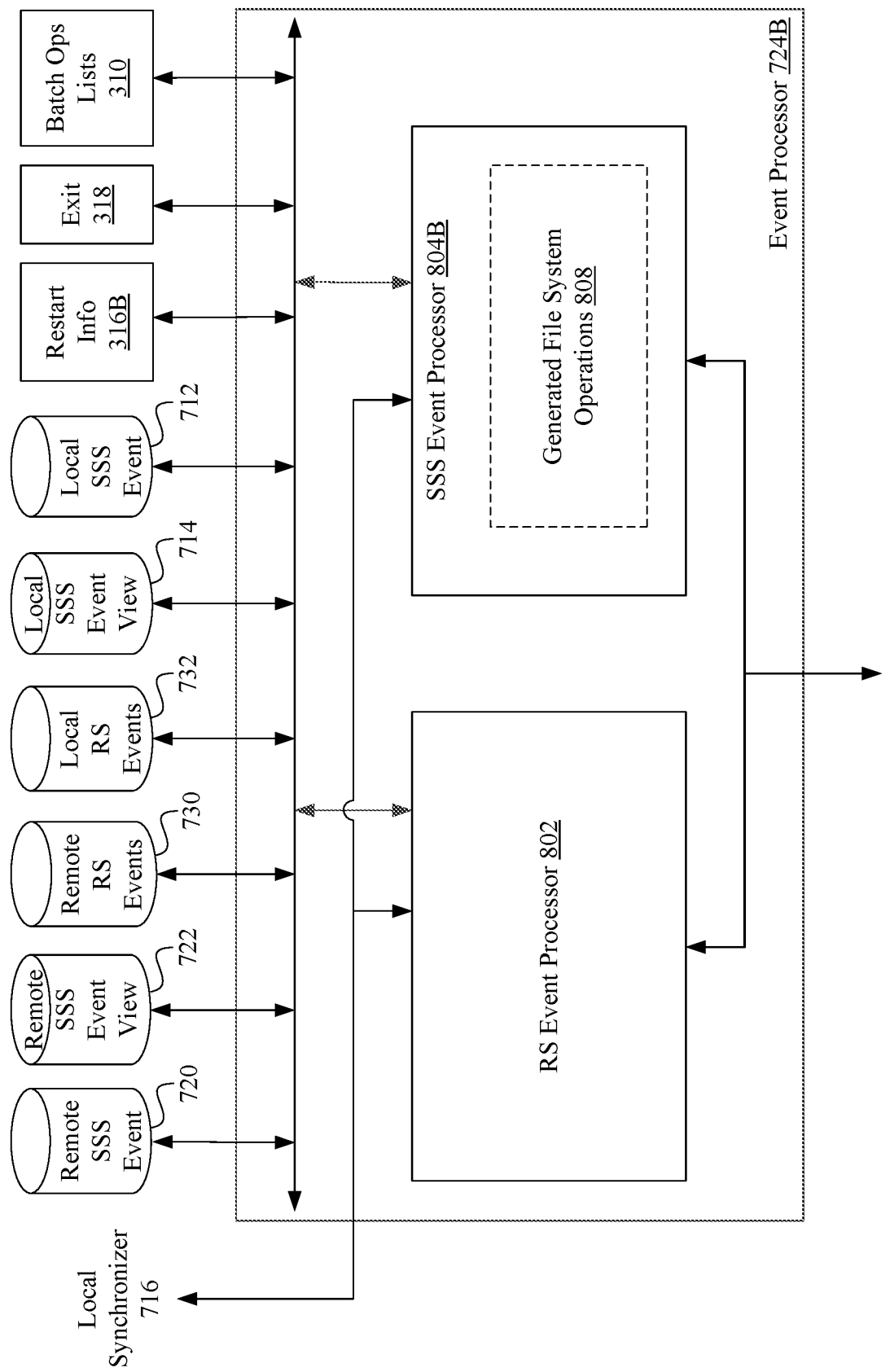
FIG. 8B is a relational diagram showing the functional elements of the event processor of FIG. 7 in greater detail according to another exemplary embodiment.

FIG. 8A was described with respect to an embodiment that persists one operation when an SSS is interrupted. FIG. 8B, however, is a relational diagram showing an event processor 724B for an embodiment that persists all remaining operations 808, optionally including batch operations lists 310, upon termination of the SSS. A SSS event processor 804B of event processor 724B functions similarly to SSS event processor 804, except for a few differences. When an SSS is terminated early, SSS event processor 804B causes all remaining operations 808 (and optionally batch lists 310) to be persisted as restart information 316B. Thus, restart information 316B can define many persisted operations 320. On restart, if there are no persisted operations 320, SSS event processor 804B processes events for a new SSS. However, if there are persisted operations 320, SSS event processor 804B obtains all the persisted operations 320, including batch lists 310 if also saved, in restart information 316B and applies the operations to RFS 202 and LFS 204, without the need for matching one persisted operation to a corresponding regenerated operation. As above, if batch operations lists are saved, the operations thereon are applied before the persisted operations.

While the embodiment of FIG. 8B provides an advantage in that matching a persisted operation is not required, the task of persisting a very large number of operations has the disadvantage of being time and resource intensive. Because the number of remaining operations 808 can vary widely, the time required to persist all remaining operations is unpredictable and would delay service restarts for an unpredictable amount of time. In contrast, the time and data storage needed to persist one operation for restart, as in FIG. 8A, allows the synchronization services to be restarted sooner and within a predictable time frame.

Methods of the present invention will now be described with reference to FIGS. 9-12. For the sake of clear explanation, these methods might be described with reference to particular elements of the previously-described embodiments. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Furthermore, some steps of the methods presented herein need not necessarily occur in the order shown and, in some cases, two or more method steps may occur simultaneously. These and other variations of the methods disclosed herein will be readily apparent, especially in view of the description of the present invention provided previously herein, and are considered to be within the full scope of the invention.

Figure 9:
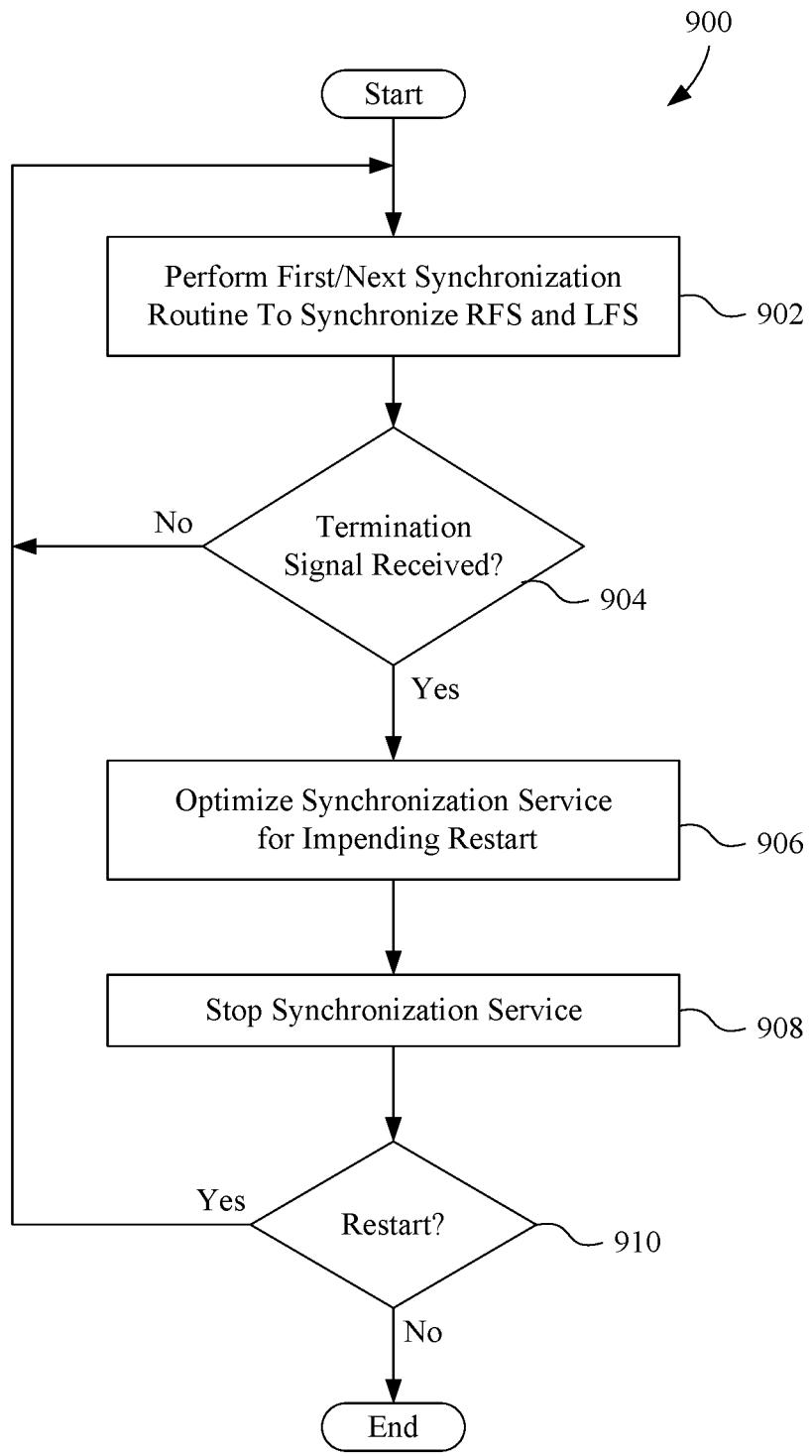
FIG. 9 is a flowchart summarizing an exemplary method for restarting a synchronization process.

FIG. 9 is a flowchart summarizing an exemplary method 900 for restarting an interrupted synchronization. In a first step 902, a first/next synchronization routine is performed to synchronize the RFS and the LFS. The synchronization routine can be a FFS, a FRS, a LRS, or a SSS. Next, at a second step 904, it is determined whether or not a synchronization service termination signal has been received. If not, then method 900 returns to step 904 to continue the same routine, perform a new synchronization routine, etc. However, if a termination signal is received, method 900 continues to a third step 906 where the synchronization service is optimized for an impending restart. Restart optimization includes persisting restart information in non-volatile memory for use on restart, etc. Then, in a fourth step 908, the synchronization service is stopped. Thereafter, in a fifth step 910, it is determined (e.g., by an administrator, by a local cloud reboot, etc.) if the synchronization service is to be restarted. If so, method 900 returns to step 902, otherwise method 900 ends.

Figure 10:
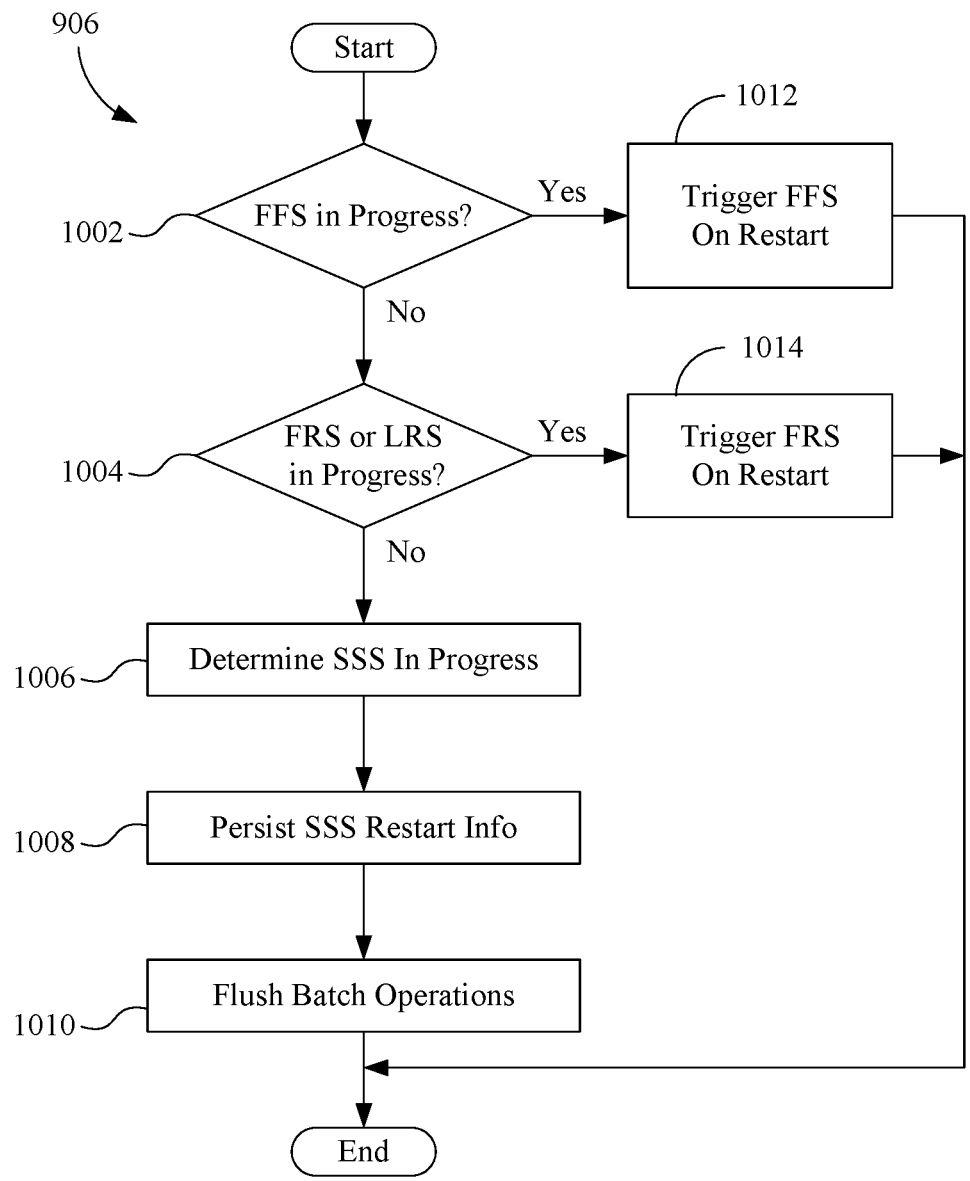
FIG. 10 is a flowchart summarizing an exemplary method for performing the third step (Optimize Sync Service for Impending Restart) of the method of FIG. 9.

FIG. 10 is a flowchart summarizing an exemplary method for performing the third step 906 (optimize synchronization service for impending restart) of method 900. In a first step 1002, it is determined whether or not an FFS is in progress. If not, then in a second step 1004, it is determined whether an FRS or an LRS is in progress. If not, then in a third step 1006, it is determined that an SSS is in progress. In a fourth step 1008, restart information is persisted that includes at least one SSS operation that indicates where a restarted SSS should be continued from. Additionally, in a fifth step 1010, any batch operations lists for the SSS are flushed and their operations applied to the appropriate file systems, and method 906 ends.

If, however, in first step 1002, it is determined that an FFS is in progress, then method 906 continues to a sixth step 1012. There, the synchronization service is set to trigger an FFS on restart (e.g., by persisting an indication of the terminated sync-type 322), and method 906 ends. Similarly, if in second step 1004, it is determined that an FRS or LRS is in progress, then method 906 proceeds to a seventh step 1014, wherein the synchronization service is set to trigger an FRS on restart (e.g., by persisting an indication of the terminated sync-type 322), and method 906 ends.

Figure 11:
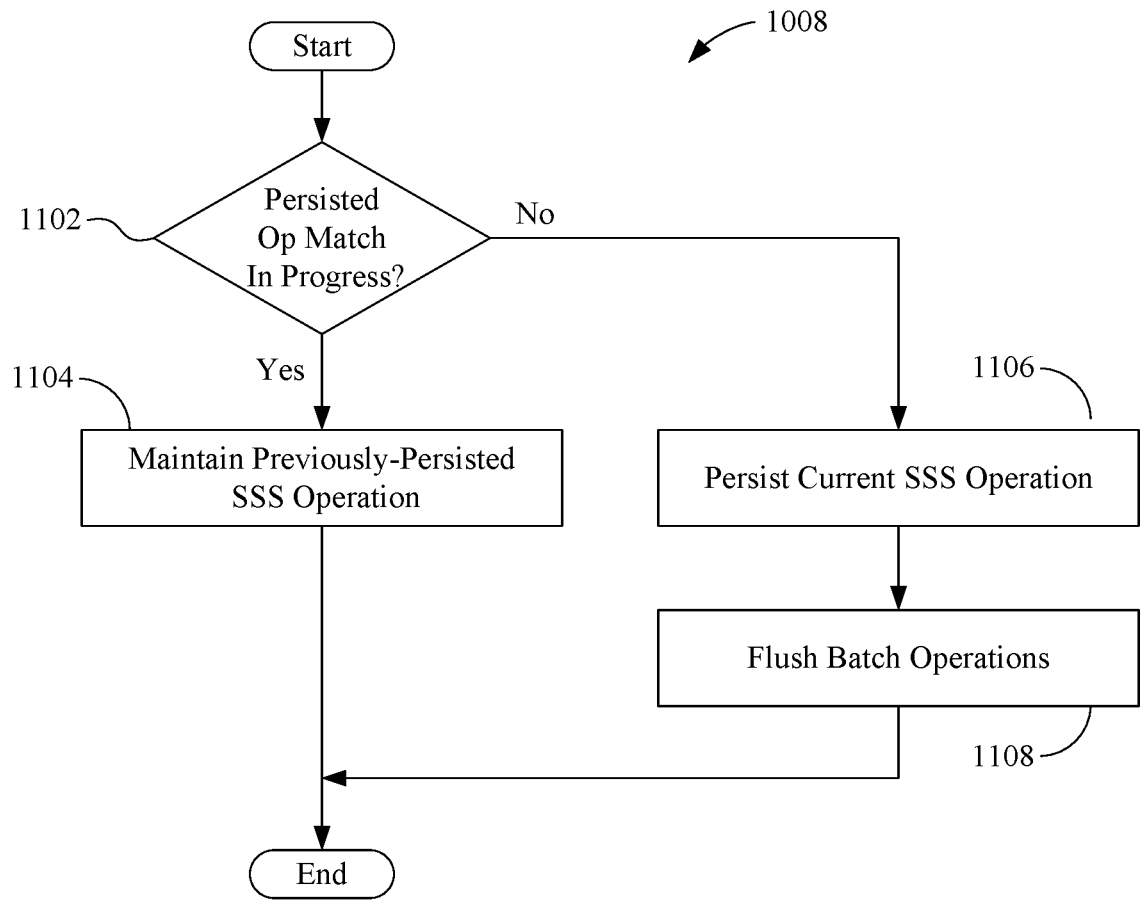
FIG. 11 is a flowchart summarizing an exemplary method for performing the fourth step (Persist SSS Restart Information) of the method of FIG. 10.

FIG. 11 is a flowchart summarizing an exemplary method for performing the fourth step 1008 (persist SSS restart information) of the method of FIG. 10. In a first step 1102, it is determined whether or not a persisted operation match is in progress as part of the current SSS (indicating that the current SSS is attempting to restart a prior SSS itself). If a persisted operation match is still in progress, then method 1008 continues to a second step 1104, before ending. In second step 1104, a previously-persisted SSS operation is maintained as the persisted operation, and method 1008 ends. However, if in first step 1102, a persisted operation match process is not in progress or has already completed (as indicating by a "True" matched flag), then method 1008 continues to a third step 1106, in which the current SSS file system operation is persisted as the persisted operation, and method 1008 ends.

Figure 12:
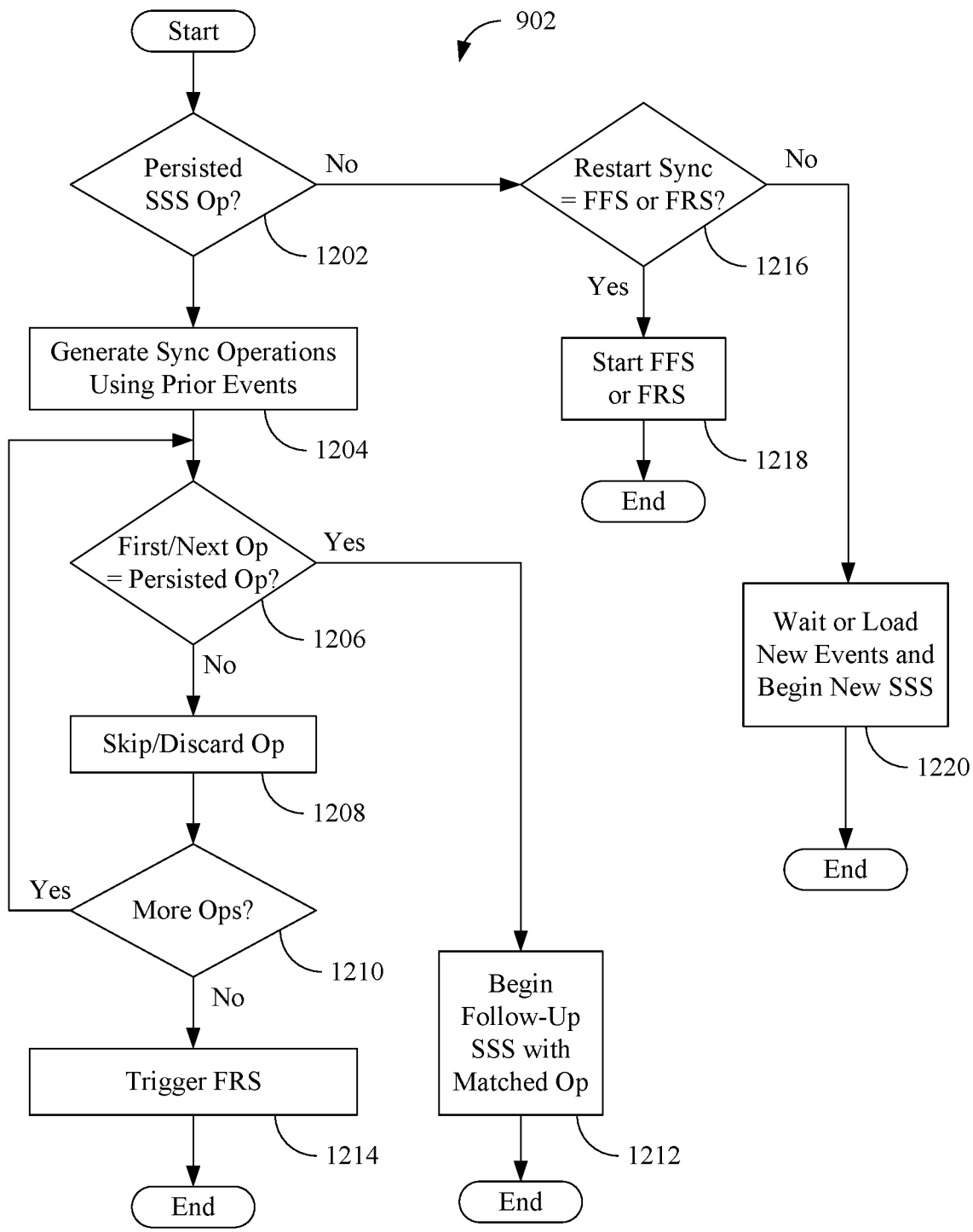
FIG. 12 is a flowchart summarizing an exemplary method for performing the first step (Perform Synchronization Routine) of FIG. 9 after restarting the synchronization service.

FIG. 12 is a flowchart summarizing an exemplary method for performing first step 902 of FIG. 9 for a follow-up SSS after restart. In a first step 1202, it is determined if an SSS file system operation has been persisted from a prior SSS, which is indicative of the restart sync-type being an SSS. (A persisted sync-type indicator could be used to determine if SSS is the restart sync-type.) If so, then in a second step 1204, the synchronization service generates a sequence of file system operations using the prior SSS events from the SSS that was interrupted. Then, in a third step 1206, it is determined if a first one of the current file system operation matches the persisted SSS operation. If not, then in a fourth step 1208, the first file system operation is skipped or discarded. Then, in a fifth step 1210, it is determined if there are more file system operations in the sequence to check for a match. If so, then method 902 returns to third step 1206 and a next file system operation is compared to the persisted operation. Steps 1206 to 1210 are looped until a file system operation of the regenerated sequence is found that matches the persisted file system operation. When that happens, the method proceeds to a sixth step 1212, where file system operations for the follow up SSS are applied to the respective local and remote file systems beginning with the matched operation, and the method ends. If, however, in fifth step 1210 it is determined that there are no more file system operations to check and no match has been made in third step 1206, then the method proceeds to a seventh step 1214, and an FRS is triggered because an error occurred.

If, however, in first step 1202, there is no persisted SSS operation, then method 902 proceeds to an eighth step 1216 where it is determined if the sync-type on restart is to be an FFS or FRS (e.g., by checking a persisted prior synchronization type indicator in the restart information). If so, then in a ninth step 1218, the synchronization service begins an FFS (for a prior sync type of FFS) or a FRS (for prior sync type of FRS or LRS). However, if in eighth step 1216, an FFS or FRS is not triggered (e.g., indicating a prior synchronization was not interrupted), then in a tenth step 1220 the synchronization service loads new SSS events and begin a new SSS or waits to start a new synchronization at a later time.

The description of particular embodiments of the present invention is now complete. Many of the described features may be substituted, altered, or omitted without departing from the scope of the invention. For example, although the synchronization and restart aspects are shown being performed by the local cloud in the example embodiment, these and other aspects may be performed by the remote cloud instead. As another example, the processes performed by the restart optimizer could be integrated in the SSS or snapshot-based sync engines/modules or split between them. As still another possibility, different restart information could be persisted. For example, a chronological log of synchronizations could be maintained, rather than persisting a sync-type with the persisted operation. In addition, alternative system architectures, communication protocols, file formats, etc. may be substituted, where applicable, for those specified in the present application. These and other deviations from the particular embodiments shown will be apparent to those skilled in the art, particularly in view of the foregoing disclosure.

We claim:

1. In a local file storage system, a method for synchronizing a local file system (LFS) stored on said local file storage system with a remote file system (RFS) stored on a remote file storage system, said method comprising:

monitoring said LFS for local changes to local metadata corresponding to said LFS;

generating local events responsive to identifying said changes to said local metadata, said local events including information at least partially indicative of said changes;

receiving remote events from said remote file storage system, said remote events including information at least partially indicative of remote changes to remote metadata corresponding to said RFS;

generating a sequence of file system operations based on at least a subset of said local events and said remote events;

processing a first portion of said sequence of file system operations to create a first group of said file system operations to be applied to said LFS and a second group of said file system operations to be applied to said RFS, said step of processing said sequence of file system operations being separate from applying said file system operations to said LFS or to said RFS;

synchronizing said LFS and said RFS based on said sequence of said file system operations, said step of synchronizing including applying at least some of said file system operations of said first group to said LFS and providing at least some of said file system operations of said second group to said remote file storage system for application to said RFS;

periodically, during said step of processing said first portion of said sequence of file system operations, determining whether a termination signal is received, said termination signal indicating that synchronizing said LFS and said RFS is to be stopped;

receiving said termination signal;

responsive to determining that said termination signal was received, persisting restart information in non-volatile memory, said restart information identifying said first portion of said sequence of file system operations that was processed and a second portion of said sequence of file system operations that was not processed; and stopping said step of synchronizing said LFS and said RFS.

2. The method of claim 1, further comprising applying a plurality of operations associated with a batch from said first portion of said sequence of file system operations after receiving said termination signal and before stopping said step of synchronizing said LFS and said RFS.

3. The method of claim 1, wherein said step of persisting said restart information includes persisting at least one file system operation of said sequence.

4. The method of claim 3, wherein said step of persisting said restart information includes persisting a plurality of said file system operations of said sequence.

5. The method of claim 3, further comprising:
retrieving said at least one persisted operation from said non-volatile memory; and
restarting synchronization of said LFS and said RFS based on said at least one persisted file system operation.

6. The method of claim 5, wherein said step of restarting synchronization of said LFS and RFS comprises:
regenerating said sequence of file system operations;
comparing said at least one persisted file system operation of said sequence to said regenerated sequence of file system operations to attempt to match said at least one persisted file system operation with at least one file system operation of said regenerated sequence; and
if said at least one persisted file system operation is matched with at least one file system operation of said regenerated sequence, restarting synchronization of said LFS and said RFS based on said at least one matched operation of said regenerated sequence.

7. The method of claim 6, wherein:
said step of persisting at least one operation of said sequence of file system operations includes persisting exactly one operation of said sequence of file system operations; and
said exactly one persisted operation is a first operation of said second portion of said sequence of file system operations.

8. The method of claim 6, further comprising:
receiving a second termination signal following said step of restarting said synchronization, said second termination signal indicating that synchronizing said LFS and said RFS is to again be stopped; and
persisting new restart information in said non-volatile memory responsive to said second termination signal only if said step of comparing has matched said at least one persisted file system operation with at least one file system operation of said regenerated sequence.

9. The method of claim 6, further comprising performing a snapshot-based synchronization of said LFS and said RFS if said step of comparing yields no match.

10. The method of claim 6, wherein:
said step of regenerating said sequence of file system operations includes generating said sequence of file system operations again based on said subset of said local events and said remote events.

11. The method of claim 1, further comprising restarting said step of synchronizing said LFS and said RFS at the beginning of said second portion of said sequence of said file system operations based on said restart information.

12. The method of claim 11, wherein:
said step of persisting said restart information to said non-volatile memory includes persisting at least part of said second portion of said sequence of file system operations to said non-volatile memory; and
said step of restarting said step of synchronizing said LFS and said RFS includes retrieving said at least part of said second portion of said sequence of file system operations from said non-volatile memory.

13. A local file storage system for synchronizing a local file system (LFS) stored thereon with a remote file system (RFS) stored on a remote file storage system remotely located from said file storage system, said file storage system comprising:
a processor configured to execute code;
non-volatile memory configured to store data including when said local file storage system is powered down;
an event processor configured to
monitor said LFS for local changes to local metadata corresponding to said LFS,
generate local events responsive to identifying said changes to said local metadata, said local events including information at least partially indicative of said changes, and
receive remote events from said remote file storage system, said remote events including information at least partially indicative of remote changes to remote metadata corresponding to said RFS; and
a storage synchronizer configured to
generate a sequence of file system operations based on at least a subset of said local events and said remote events, said sequence of file system operations synchronizing said LFS and said RFS when applied,
process a first portion of said sequence of file system operations to create a first group of said file system operations to be applied to said LFS and a second group of said file system operations to be applied to said RFS, said step of processing being separate from applying said file system operations to said LFS or to said RFS;
synchronize portions of said LFS and said RFS by applying at least some of said first group of said file system operations to said LFS and providing at least some of said second group of said file system operations to said remote file storage system for application to said RFS,
periodically, while processing said first portion of said sequence of file system operations, determine whether a termination signal is received, said termination signal indicating that synchronizing said LFS and said RFS is to be stopped,
receive said termination signal,
responsive to determining that said termination signal was received, persist restart information in non-volatile memory responsive to said termination signal, and
stop synchronization of said LFS and said RFS responsive to said termination signal; and wherein
said restart information identifies said first portion of said sequence of file system operations that was processed and a second portion of said sequence of file system operations that was not processed.

14. The local file storage system of claim 13, wherein said storage synchronizer is configured to apply a plurality of operations associated with a batch from said first portion of said sequence of file system operations after receiving said termination signal and before stopping said synchronization of said LFS and said RFS.

15. The local file storage system of claim 13, wherein said storage synchronizer is configured to persist at least one file system operation of said sequence in said non-volatile memory.

16. The local file storage system of claim 15, wherein said storage synchronizer is configured to persist a plurality of said file system operations of said sequence.

17. The local file storage system of claim 15, wherein said storage synchronizer is further configured to:
   retrieve said at least one persisted operation from said non-volatile memory; and
   restart synchronization of said LFS and said RFS based on said at least one persisted file system operation.

18. The local file storage system of claim 17, wherein said storage synchronizer is further configured to:
   regenerate said sequence of file system operations;
   compare said at least one persisted file system operation of said sequence to file system operations of said regenerated sequence in order to attempt to match said at least one persisted file system operation with at least one file system operation of said regenerated sequence; and
   if said at least on persisted file system operation is matched with at least one file system operation of said regenerated sequence, restart synchronization of said LFS and said RFS based on said at least one matched operation of said regenerated sequence.

19. The local file storage system of claim 18, wherein:
   said storage synchronizer is further configured to persist exactly one operation of said sequence of file system operations; and
   said exactly one persisted operation is a first operation of said second portion of said sequence of file system operations.

20. The local file storage system of claim 18, wherein said storage synchronizer is further configured to:
   receive a second termination signal following restart of said synchronization of said LFS and said RFS, said second termination signal indicating that synchronization of said LFS and said RFS is to again be stopped; and
   persist new restart information in said non-volatile memory responsive to said second termination signal only if said at least one persisted file system operation has been matched with at least one file system operation of said regenerated sequence.

21. The local file storage system of claim 18, wherein said storage synchronizer is further operative to perform a snapshot-based synchronization of said LFS and said RFS if said comparison yields no match.

22. The local file storage system of claim 18, wherein:
   said storage synchronizer is operative to regenerate said sequence of file system operations again based on said subset of said local events and said remote events.

23. The local file storage system of claim 13, wherein said storage synchronizer is further operative to restart synchronization of said LFS and said RFS at the beginning of said second portion of said sequence of said file system operations based on said restart information.

24. The local file storage system of claim 23, wherein said storage synchronizer is configured to:
   persist said second portion of said sequence of file system operations to said non-volatile memory as said restart information; and
   retrieve said second portion of said sequence of file system operations from said non-volatile memory as part of restarting said synchronization.

25. A non-transitory, electronically-readable storage medium having code embodied thereon for causing an electronic device to synchronize a local file system (LFS) stored on a local file storage system with a remote file system (RFS) stored on a remote file storage system, said code operative to cause said electronic device to:
   monitor said LFS for local changes to local metadata corresponding to said LFS;
   generate local events responsive to identifying said changes to said local metadata, said local events including information at least partially indicative of said changes;
   receive remote events from said remote file storage system, said remote events including information at least partially indicative of remote changes to remote metadata corresponding to said RFS;
   generate a sequence of file system operations based on at least a subset of said local events and said remote events;
   process a first portion of said sequence of file system operations to create a first group of said file system operations to be applied to said LFS and a second group of said file system operations to be applied to said RFS, said step of processing said sequence of file system operations being separate from applying said file system operations to said LFS or to said RFS;
   synchronize said LFS and said RFS based on said sequence of said file system operations by applying at least some of said file system operations of said first group to said LFS and providing at least some of said file system operations of said second group to said remote file storage system for application to said RFS;
   periodically, during processing of said first portion of said sequence of file system operations, determine whether a termination signal is received, said termination signal indicating that synchronizing said LFS and said RFS is to be stopped;
   receive said termination signal indicating that synchronization of said LFS and said RFS is to be stopped;
   responsive to determining that said termination signal was received, persist restart information in non-volatile memory; and
   stop said step of synchronizing said LFS and said RFS; and wherein
   said restart information identifies said first portion of said sequence of file system operations that was processed and a second portion of said sequence of file system operations that was not processed.

* * * * *